(12) United States Patent
Herrington et al.

(10) Patent No.: US 6,922,843 B1
(45) Date of Patent: Jul. 26, 2005

(54) INTERACTIVE TELEVISION PROGRAM GUIDE SYSTEM WITH MULTIPLE ACCOUNT PARENTAL CONTROL

(75) Inventors: W. Benjamin Herrington, Tulsa, OK (US); Edward B. Knudson, Littleton, CO (US); Michael D. Ellis, Boulder, CO (US)

(73) Assignee: United Video Properties, Inc., Tulsa, OK (US)

( * ) Notice: Subject to any disclaimer, the term of this patent is extended or adjusted under 35 U.S.C. 154(b) by 551 days.

(21) Appl. No.: 09/635,596

(22) Filed: Aug. 9, 2000

Related U.S. Application Data

(60) Provisional application No. 60/147,982, filed on Aug. 9, 1999.

(51) Int. Cl.[7] ................................................. H04N 7/16
(52) U.S. Cl. ............................ 725/30; 725/11; 725/28; 725/29; 725/40
(58) Field of Search ................................ 725/9, 11, 39, 725/40, 46, 1–8, 14–20, 25–31, 60–61

(56) References Cited

U.S. PATENT DOCUMENTS

| | | | |
|---|---|---|---|
| 5,253,066 A | | 10/1993 | Vogel ........................ 358/188 |
| 5,600,364 A | | 2/1997 | Hendricks et al. ............. 348/1 |
| 5,819,156 A | * | 10/1998 | Belmont ...................... 725/14 |
| 5,850,218 A | * | 12/1998 | LaJoie et al. ................. 725/45 |
| 5,969,748 A | * | 10/1999 | Casement et al. ............ 725/27 |
| 6,163,272 A | * | 12/2000 | Goode et al. ................. 725/30 |
| 6,166,778 A | * | 12/2000 | Yamamoto et al. ......... 348/569 |
| 6,177,931 B1 | * | 1/2001 | Alexander et al. ............ 725/52 |
| 6,208,335 B1 | * | 3/2001 | Gordon et al. .............. 345/721 |
| 6,445,398 B1 | * | 9/2002 | Gerba et al. ................ 345/721 |
| 6,505,348 B1 | * | 1/2003 | Knowles et al. .............. 725/49 |
| 6,701,523 B1 | * | 3/2004 | Hancock et al. .............. 725/25 |
| 2002/0095673 A1 | * | 7/2002 | Leung et al. ................. 725/25 |

FOREIGN PATENT DOCUMENTS

| | | | | |
|---|---|---|---|---|
| WO | WO 96/34491 | 10/1996 | ......... | H04N/7/025 |
| WO | WO 99/45701 | 9/1999 | ......... | H04N/5/445 |

* cited by examiner

*Primary Examiner*—John Miller
*Assistant Examiner*—Scott Beliveau
(74) *Attorney, Agent, or Firm*—Fish & Neave IP Group of Ropes & Gray LLP

(57) ABSTRACT

A system with parental control features is provided. The system may be switched between single account control and multiple account control. Each account may have a program control code and a purchase control code. A user may set parental control criteria for controlling access to programming for each account. A user may set purchase control criteria for controlling purchasing for each account. The system may remove a block on parentally-controlled activity when an authorized user enters an appropriate purchase or program control code. Every activity that matches any of the parental control criteria may be blocked and authorized user login may be required. The system may provide a selectable bypass locks feature. The system may present targeted advertising based on which code was entered last. The system may track account usage and provide information related to usage.

24 Claims, 44 Drawing Sheets

---

362
Allow accounts to be given different access levels to program based on their parental control criteria ↓ 364
Track user access to parentally locked programs (e.g., programs that were displayed when a user's personal code was entered)

↓ 366
Display a list having information related to user access

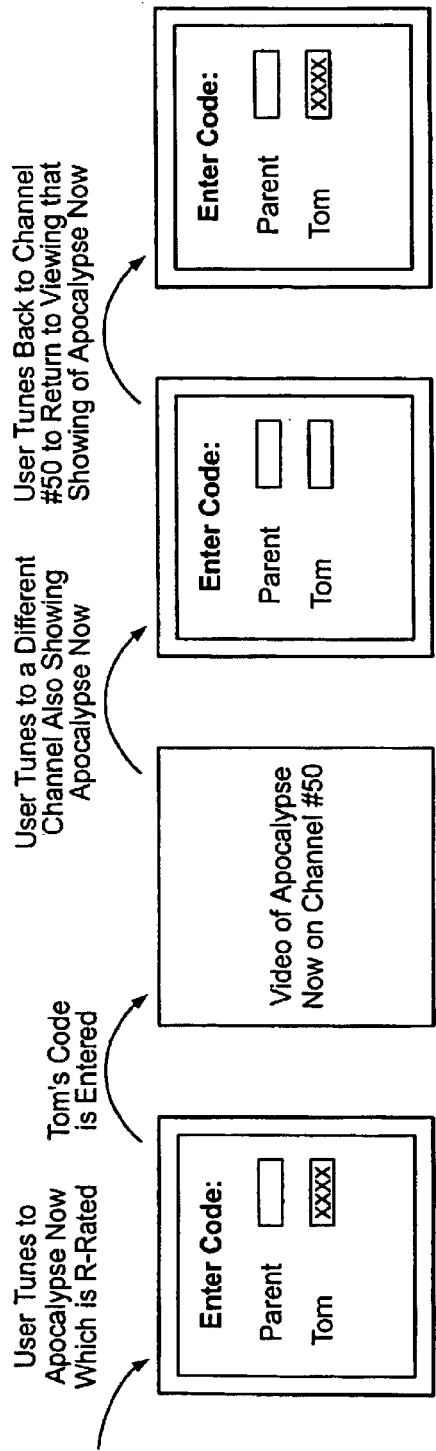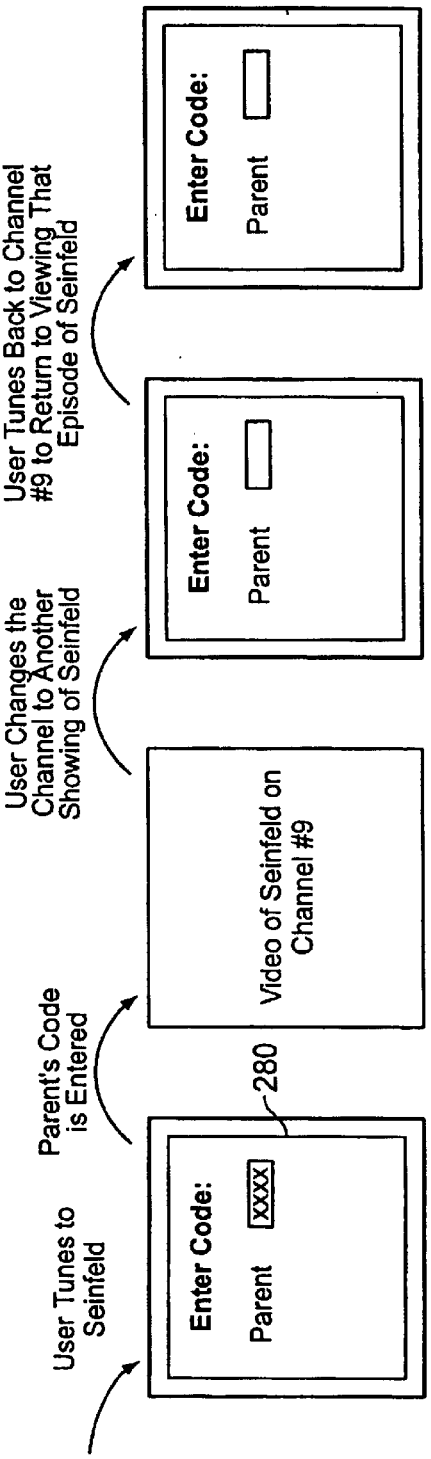
FIG. 20C
FIG. 20D

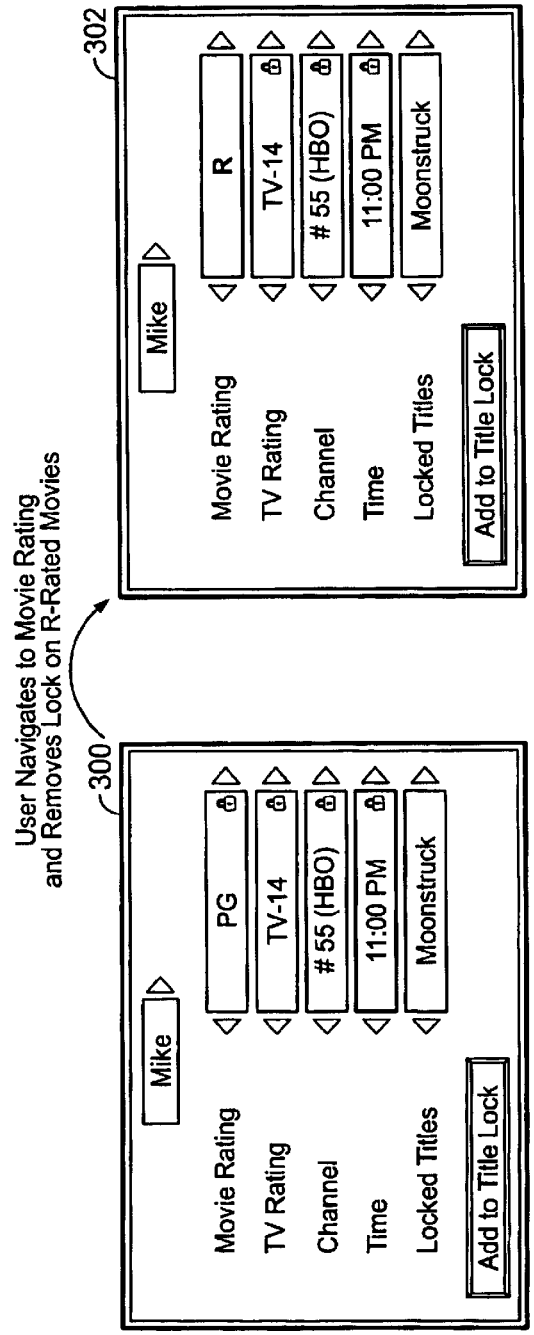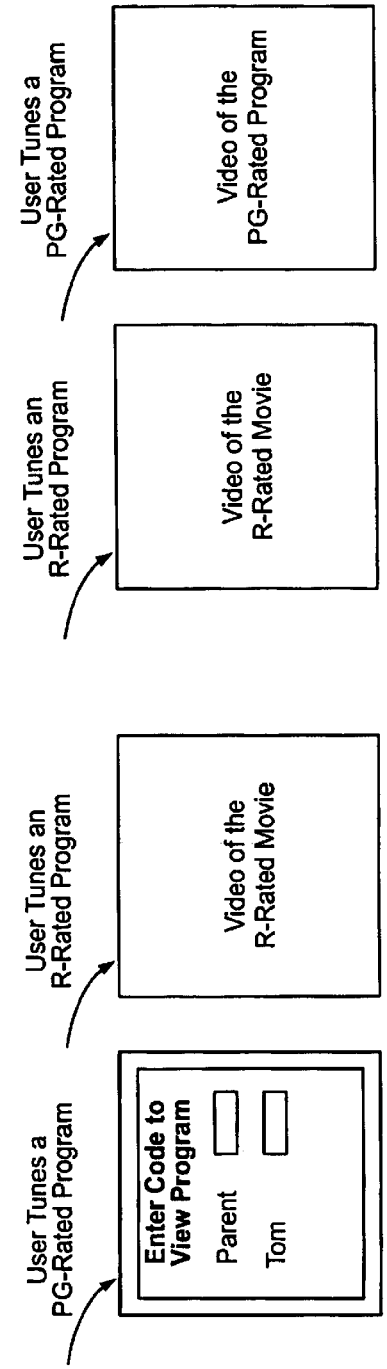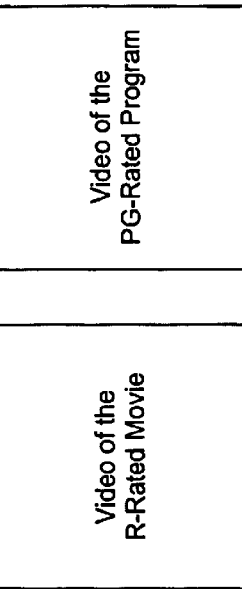
FIG. 23A
FIG. 23B
FIG. 23C

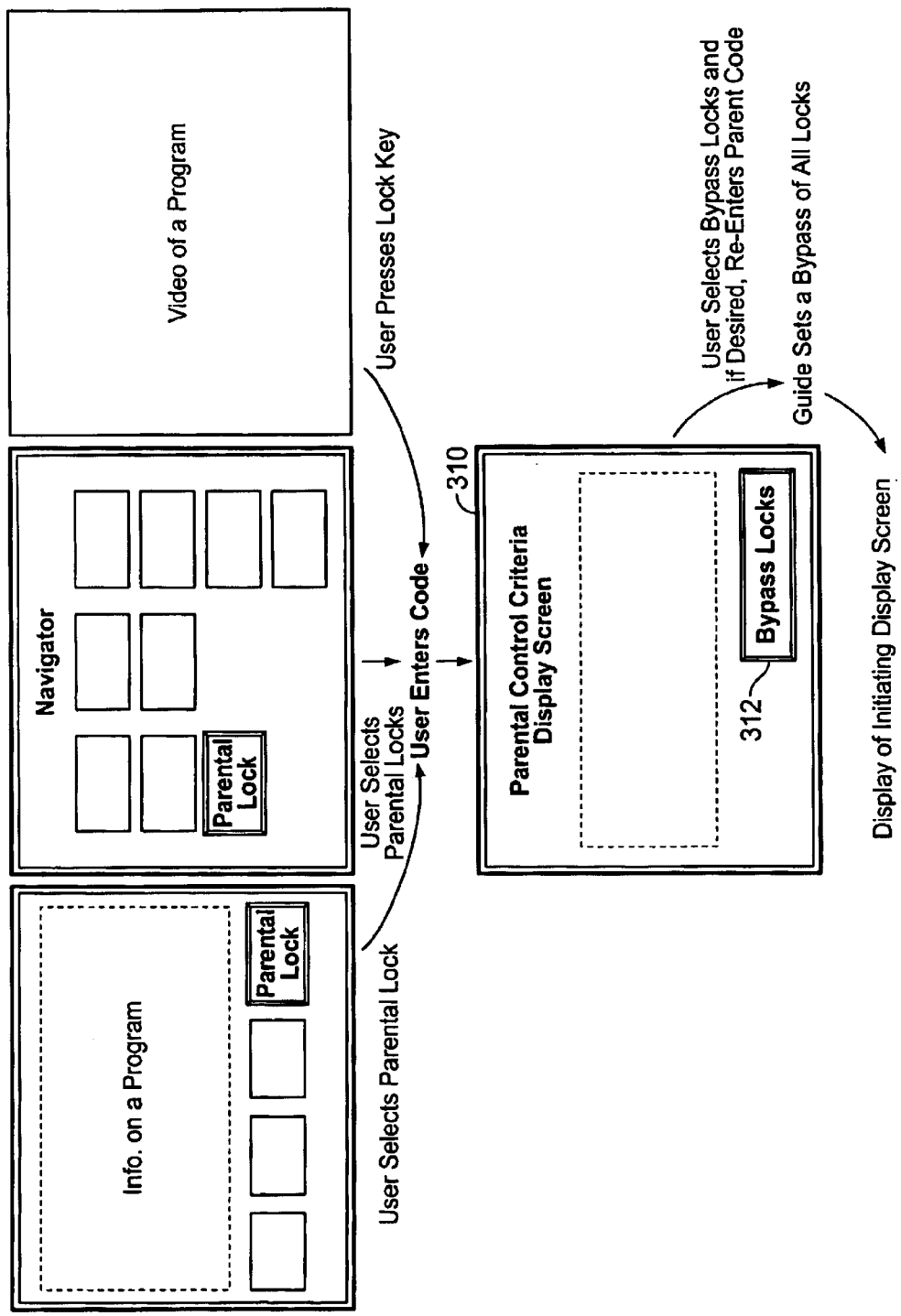

Cable Bill

| | | |
|---|---|---|
| Basic Service | | $22.00 |
| 1/18 | WWF PPV - Tom | $5.00 |
| 1/17 | HBO Service - Tom | $30.00 |
| 1/17 | Broncos Hat - Karen | $20.00 |
| 1/3 | Toy Story-2 - Karen | $5.00 |

Total Due [ ]

FIG. 32B

Credit Card Statement of Parent

Purchases:

1/17   Broncos Hat         $20.00
       Acc # - Karen

Min. Due [ ]

FIG. 32C

A Child User Tunes an R-Rated Program

User Selects an Option to Order a Product

INTERACTIVE TELEVISION PROGRAM GUIDE SYSTEM WITH MULTIPLE ACCOUNT PARENTAL CONTROL

This application claims the benefit of U.S. provisional application No. 60/147,982, filed Aug. 9, 1999.

BACKGROUND OF THE INVENTION

This invention relates to interactive television program guide systems, and more particularly, to parental control techniques for use in interactive television program guide systems.

Cable, satellite, and broadcast television systems provide viewers with a large number of television channels. Viewers have traditionally consulted printed television program schedules to determine the programs being broadcast at a particular time. More recently, interactive electronic television program guides have been developed that allow television program information to be displayed on a viewer's television.

Interactive program guides are typically implemented on set-top boxes. Such program guides allow users to view television program listings in different display formats. For example, a user may instruct the program guide to display a grid of program listings organized in a channel-ordered or a time-ordered list. Users may also search and sort program listings by theme (e.g., movies, sports, etc.) or by title (i.e., alphabetically). A user may obtain additional information for a program by placing a highlight region on a desired program listing and pressing an "info" key. The user may purchase a pay program from the program guide or may set a reminder for a future program by placing the highlight region on a program listing and pressing an "OK" key. Some systems allow the user to select a program for recording by placing the highlight region on a program listing and pressing a "record" key.

Some known interactive program guides offer a parental control feature. Using this feature, access to programming may be parentally controlled based on certain program characteristics, such as program titles, ratings, times, or channels. For example, a program guide may block certain programming based on program characteristics that have been selected by a user (e.g., a parent). In such systems, blocked programming may be unblocked by entering a parental control code.

Purchase control is offered in some interactive program guides. When a user attempts to make a purchase through the interactive program guide, such as an impulse pay-per-view purchase, the interactive program guide may ask the user for a purchase code, and may not allow the purchase to be completed unless the purchase code is entered.

In such systems, parents are not able to specify different levels of control for children at different levels of maturity or responsibility. This and other inadequacies make prior techniques unsuitable for many users.

SUMMARY OF THE INVENTION

In accordance with the principles of the present invention, a system for providing multiple level parental control features on user television equipment may be provided. The system provides a parent with an opportunity to specify different levels of control for children at different levels of maturity or responsibility. The system may block all programming that is under parental control until a code for a user who is authorized to view that particular programming is entered. The code may be a personal identification code that is entered to show to the system that a particular user is now present.

The system may allow users to set up multiple accounts (e.g., one account for every user in the household). One or more personal identification codes may be associated with each account. For example, a personal identification code for program control (e.g., a program control code) and a personal identification code for purchase control (e.g., a purchase control code) may be associated with each account. A user (e.g., a parent) may be allowed to specify a name for each account. If desired, predefined names may be assigned to the accounts.

A user may be allowed to specify that one or more accounts is a parent account. Use of codes that are for a parent account may provide access to all system features and all programming. Other accounts may have more limited access.

To set up a parental control criteria, a user may select a parental control feature. The system may display an overlay or display screen prompting for a program control code of a parent account when a parental control feature is selected. When there are multiple parent accounts, a prompt for each parent account may be provided. Access to a parental control feature may be provided when a program control code for at least one parent account has been entered.

Correct entry of a program control code for a parent account may allow a user to create parental control criteria for accounts (e.g., all accounts in a household). For example, the system may display a parental control criteria display screen that allows a user to navigate between subscreens for each account (e.g., by pressing a left or right arrow key on a remote control). Each subscreen may provide a user with an opportunity to specify lock criteria for the account that is associated with that subscreen. If desired, the subscreens may only be for non-parent accounts.

Within the parental control criteria display subscreen, the user may navigate (e.g., by pressing an up or down arrow key on the remote control) between individual attribute categories (e.g., title, movie rating, TV rating, channel, time, etc.). The user may be allowed to navigate between attribute values for each category (e.g., by pressing a left or right arrow key for each category). As each attribute value is displayed, the system may display an indicator (e.g., an icon), showing whether that particular attribute value is already locked for the account that is associated with the current subscreen. The user may be allowed to change the lock status of attribute values (e.g., by pressing a lock or data entry key of a remote control).

If desired, the system may display a display screen having a list of attribute categories, may allow a user to navigate between attribute values for each, and may allow the user to change the lock status of each value. An indicator for each value may be displayed to reflect whether any of the accounts has that value locked. When a user is finished, the system may display a list of the accounts (preferably, none of which are parent accounts) and may allow a user to select to which accounts the changed settings should apply.

If desired, the system may allow the user to select some of the accounts before setting the lock criteria. An indicator may be displayed with each attribute value that reflects whether any of the selected accounts has that attribute value currently locked. The settings for each of the selected accounts may change when the lock status of each attribute value is changed.

If desired, parental control criteria may be set using an example. The system may allow the user to select a program in connection with a parental control feature. When a program is selected in connection with the parental control feature, the system may prompt a user for the entry of a parent program control code. The system may display a lock by example overlay or display screen when a correct parent program control code is entered. The overlay or display screen may include attribute values for the selected program. The system may allow the user to navigate to the program attribute values and change the lock status for each. The changes may be applied to different accounts using sub-screens or by prompting the user to select accounts before or after making changes to the settings.

If desired, attribute values may be entered using a keyboard, a remote control, a display remote control, a search display screen, etc. If desired, a parental control criteria display screen may have an add-a-title lock option.

The system may have a list of active locks. Each active lock may be related to a particular value for an attribute category. Each lock that is active for a particular attribute value may be associated with a list of authorized accounts that are to be allowed to view programming having that particular locked attribute value after entry of an appropriate code.

The system may block audio and video of a program and prompt for the entry of a program code when a user attempts to watch a program that has an attribute value that has been locked. Users may be prompted for the entry of their codes using an overlay or display screen that provides the names of accounts and a space next to each account name. The names that are included in the display or overlay may be the account names for the accounts that are authorized to view the program. Account names for accounts that are not authorized may be omitted from being displayed or may be displayed in a way that shows that code entry is for other accounts that are authorized to view the program. The system may remove the overlay or display screen and may play the audio and video of a blocked program when at least one valid code for a parent account or for an account that is authorized to view the program is entered.

When a user has entered a control code to watch a program and the program ends and a subsequent program that is locked begins, the system may again force entry of a control code. If desired, the system may continue to allow user access when a subsequent locked program begins as long as the channel is not changed. Whether the system forces another code entry may also depend on the attribute category of a lock, the last entered control code, or both.

When a user locks a rating, the system may lock all programs (e.g., blocks access to program audio and video) that have a rating that exactly matches the locked rating. If desired, the system may lock all programs that match the locked rating exactly and match higher ratings.

If desired, the system may force another code entry when any locked program is tuned, even if the user had previously entered a code to watch that same program (e.g., another code entry may be forced when a user returns to viewing a particular airing of a program for which the user had already earlier entered a code when the channel for that program was first tuned to watch that airing of that program).

The system may include a bypass locks feature. Access to the bypass locks feature may be provided when a program control code is entered. If desired, access to the bypass locks feature may be limited to parent accounts. When a user turns on the bypass locks feature, all programming may be viewed without requiring code entry. The bypass may be turned off automatically when a user turns the system on or off. If desired, the bypass may be turned off automatically after a specified period of time.

The system may provide parental control of purchasing based on the features that are provided for parental control of programming. A user (preferably a parent) may be provided with an opportunity to specify whether each account is authorized to make purchases. If desired, the system may allow the user to specify what types of purchases are to be allowed for each account. If desired, the system may allow the user to specify how much an account is authorized to spend. When a user attempts to make a purchase through the system, the system may display an overlay or display screen that allows entry of a purchase control code from any of the accounts that are authorized to make such purchases and which have not exceeded their spending limits. If desired, the system may allow any one of the users to enter their purchase control code, determine whether that account is authorized to make the current purchase, notify unauthorized users that their purchase attempt has been blocked, and allow authorized users to complete the purchase.

The system may track account usage. The system may use this information to list parentally controlled programs that have been accessed, to display a list of purchases that have been made, to provide tracking information to a billing entity, etc. The system may display targeted advertising based on which code was entered last.

A user (preferably, a parent) may be provided with an opportunity to select between multiple-level parental control and single account parental control features. If desired, multiple-level parental control and single account control features may be selected automatically. When the single account feature has been selected, the user may be allowed to set control criteria for one account. The control criteria may be applied globally with access to locked programming requiring entry of parent code.

Further features of the invention, its nature and various advantages will be more apparent from the accompanying drawings and the following detailed description of the preferred embodiments.

BRIEF DESCRIPTION OF THE DRAWINGS

FIG. 19b is a diagram of an illustrative sequence of illustrative display screens that is based on the illustrative lock list of FIG. 19a in accordance with the present invention.

FIGS. 19c and 19d are diagrams of illustrative display screens that are based on the illustrative lock list of FIG. 19a in accordance with the present invention.

FIG. 20c is a diagram of an illustrative sequence of illustrative display screens that is based on the illustrative lock list of FIG. 20a in accordance with the present invention.

FIG. 20d is a diagram of an illustrative sequence of illustrative display screens that is based on the illustrative lock list of FIG. 20a in accordance with the present invention.

FIG. 23a is a diagram of an illustrative sequence of illustrative display screens that involve removing a lock on a rating in accordance with the present invention.

FIG. 23b is a diagram of two illustrative display screens that are based on the illustrative display screens of FIG. 23a in accordance with the present invention.

FIG. 23c is a diagram of two illustrative display screens that are based on the illustrative display screens of FIG. 23a in accordance with the present invention.

FIG. 25 is a diagram of an illustrative sequence of illustrative display screens that is based on the illustrative steps of FIG. 24 in accordance with the present invention.

FIG. 32b is a diagram of an illustrative cable service billing statement in accordance with the present invention.

FIG. 32c is a diagram of an illustrative credit card statement in accordance with the present invention.

DETAILED DESCRIPTION OF THE PREFERRED EMBODIMENTS

Figure 1A:
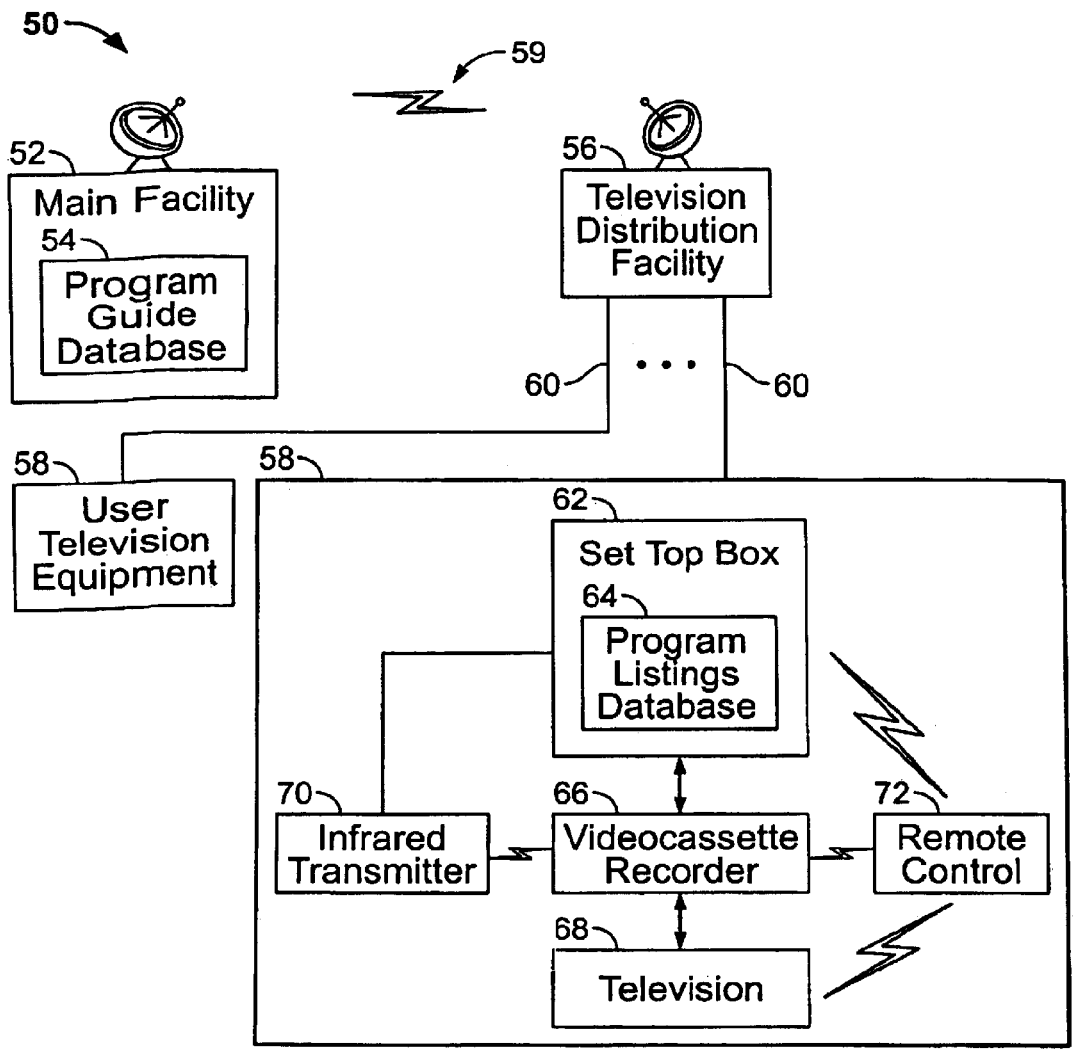
FIG. 1a is a diagram of an illustrative interactive television program guide system in accordance with the present invention.

An illustrative interactive television program guide system 50 in accordance with the present invention is shown in FIG. 1a. Main facility 52 includes a program guide database 54 for storing program guide information (e.g., television program listings data, program-related information, service listings data, service-related information, pay-per-view ordering information, television program promotional information, etc.).

Main facility 52 preferably includes a processor to handle information distribution tasks. Information from database 54 may be transmitted in parallel via communications links such as communications link 59 to multiple television distribution facilities such as television distribution facility 56. Only one television distribution facility is shown in FIG. 1a to avoid over complicating the drawings. Each communications link 59 may be a satellite link, a telephone network link, a combination of such links, or another suitable communications path. Text, graphics, and video data signals may be transmitted over link 59. If it is desired to transmit video signals over communications link 59, a relatively high bandwidth link such as a satellite link is generally preferable to a relatively low bandwidth link such as a telephone line.

Television distribution facility 56 is a facility such as a cable system headend, a broadcast distribution facility, or a satellite television distribution facility for distributing television signals to viewers.

The program guide information transmitted by main facility 52 to television distribution facility 56 includes television program listings data such as program times, channels, titles, descriptions, program type, genre, actors, ratings, etc. Transmitted program guide information may include pay program data such as pricing information for individual programs and subscription channels, time windows for ordering programs and channels, telephone numbers for placing orders that cannot be impulse ordered, etc.

If desired, program guide information may be distributed from main facility 52 to user television equipment 58 through one or more distribution facilities that are separate from television distribution facility 56 using communication paths that are separate or at least partly separate from communication paths 60. If desired, these other distribution facilities may use communication techniques (e.g., techniques for communicating with user television equipment) that are independent of techniques for distributing television signals (e.g., a paging network communications, Internet communications, etc.).

Television distribution facility 56 or other distribution facility may distribute program guide information received from main facility 52 to user television equipment 58 via communications paths 60. User television equipment 58 may be any suitable equipment for providing television that contains sufficient processing capabilities to monitor viewing activities, analyze these activities, and display appropriate program listings information for the user.

Communications paths 60 may be cable links, fiber optic links, satellite links, broadcast links, or other suitable link, or a combination of such links. Any suitable analog, digital, or analog and digital communications scheme may be used to transmit data over paths 60, including in-band transmissions, out-of-band transmissions, digital transmissions, analog transmissions, cable transmissions, satellite transmissions, over-the-air transmissions, multichannel multipoint distribution services (MMDS) transmissions, etc.

Communications paths 60 preferably have sufficient bandwidth to allow television distribution facility 56 to distribute television programming, program listings information, advertisements, and other information to user television equipment 58. Multiple television and audio channels (analog, digital, or both analog and digital) may be provided to user television equipment 58 via communication paths 60.

The data distribution technique that is used to distribute data on paths 60 may depend on the type of information that is being distributed. For example, text and graphics may be distributed over an out-of-band channel using an out-of-band modulator or distributed in the vertical blanking interval lines of an analog video channel. Video information may also be distributed in this way, although large quantities of video information may be more efficiently distributed using one or more digital channels or streams on paths 60. Such digital channels or streams may also be used for distributing text and graphics.

Each user television equipment device 58 has a receiver which is typically a set-top box such as set-top box 62. The receiver may also be other suitable television equipment such as an advanced television receiver into which circuitry similar to set-top-box circuitry has been integrated or a personal computer television (PC/TV). For illustrative purposes, the present invention will be described primarily in the context of user television equipment 58 that uses set-top boxes.

Each set-top box 62 is typically connected to an optional videocassette recorder 66 or other recording device so that selected television programs may be recorded. Videocassette recorder 66 is typically connected to television 68. To record a program, set-top box 62 tunes to a particular channel and sends control signals to videocassette recorder 66 (e.g., using infrared transmitter 70) that instructs videocassette recorder 66 to start and stop recording at the appropriate times. If desired, system 50 may record programs at a remote server rather than on a local recording device.

Television program listings, advertisements, programming information, and other information may be displayed on television 68. Each set-top box 62, videocassette recorder 66, and television 68 can be controlled by one or more remote controls 70 or any other suitable user input interface, such as a wireless keyboard, mouse, trackball, dedicated set of buttons, touch screen display remote, etc. Remote controls, such as remote control 70, have various buttons that can be pressed by the user such as arrow keys (e.g., for directing on-screen movement of a highlight region, for directing scrolling functions, etc.), an OK, select, enter, or accept key (hereinafter referred to as an OK key), channel number keys (for selecting a television channel), a favorites key (to invoke functions related to user preferences), a delete key (to delete menu items or to express a disinterest in certain user preferences), an information key for receiving information on a program (hereinafter referred to as an INFO key), a specific feature key (e.g., a related-program search key to invoke program searching), etc. For illustrative purposes, many aspects of the present are discussed primarily in the context of a user input interface that is a remote control.

Certain program guide features, such as pay program purchasing, the purchasing of products or services, and data collection functions, may require user television equipment 58 to transmit data to television distribution facility 56 over communications paths 60. If desired, such data may be transmitted over telephone lines or other separate communications paths. If features such as these are provided using facilities separate from television distribution facility 56, some of the communications involving user television equipment 58 may be made directly with the separate facility.

If desired, an interactive television program guide system may be implemented using a data-relay architecture. In such an architecture, television distribution facility 56 may serve as a data relay site and user television equipment 58 may be a data destination site. For example, as television distribution facility 56 receives information from main facility 52, television distribution facility 56 may then continuously or periodically distribute the information to user television equipment 58. In a data-relay architecture, a program guide implemented on user television equipment 58 may use a database (e.g., database 64) for storing program guide information at user television equipment. Program guide information may include program listings and program attributes. Program attributes may be information such as program title, program actors, program duration, program genre (e.g., sports, comedy, movies, etc.), program channel, scheduled program duration, program rating (e.g., TV-G, PG-13, etc.), program content rating (or critics' rating or star rating, e.g., one star, two stars, etc.), and other related parameters that can be tagged to a program. Television distribution facility 56 may also poll set-top boxes periodically for certain information (e.g., pay program account information or information regarding programs that have been purchased and viewed using locally-generated authorization techniques).

The features of the present invention may be implemented in a client-server arrangement or in a combination client-server and data-relay arrangement. In such arrangements, the server (e.g., television distribution facility 56) may include a database that may include program listings information.

For clarity, the present invention is sometimes described primarily in the context of program guides that are implemented on user television equipment rather than in the context of program guides that are implemented partially on a server and partially on user television equipment or a more fully server-based architecture.

Each set-top box 62 preferably contains a processor to handle tasks associated with implementing an application on the set-top box 62 that assists in parental control of television programming. For example, a stand-alone application may be provided that supports parental control features, as described more fully below. If desired, these tasks may be implemented using a program guide application. For clarity, the present invention will be described primarily in the context of such a program guide application and in the context of a program guide system.

Figure 1B:
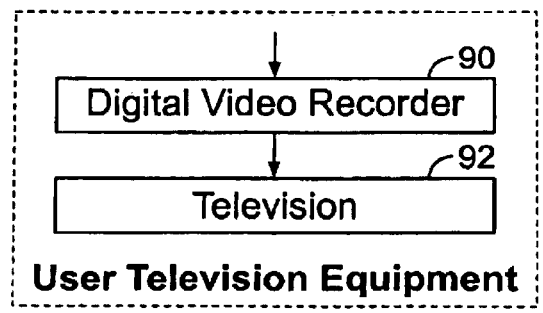
FIG. 1b is a diagram of an illustrative digital video recorder and television in accordance with the present invention.

As shown in FIG. 1b, user television equipment may include a digital video recorder 90 that may receive control signals, video signals, or both from a set-top box (e.g., set-top box 62 of FIG. 1a). Digital video recorder 90 may receive control signals from a user input interface, such as a remote control (e.g., remote control 72 of FIG. 1a). Digital video recorder 90 may include a hard-disk drive or another digital storage medium that is used to store programming. The stored programming may be played by digital video recorder 90 and displayed on television 92.

Figure 2:
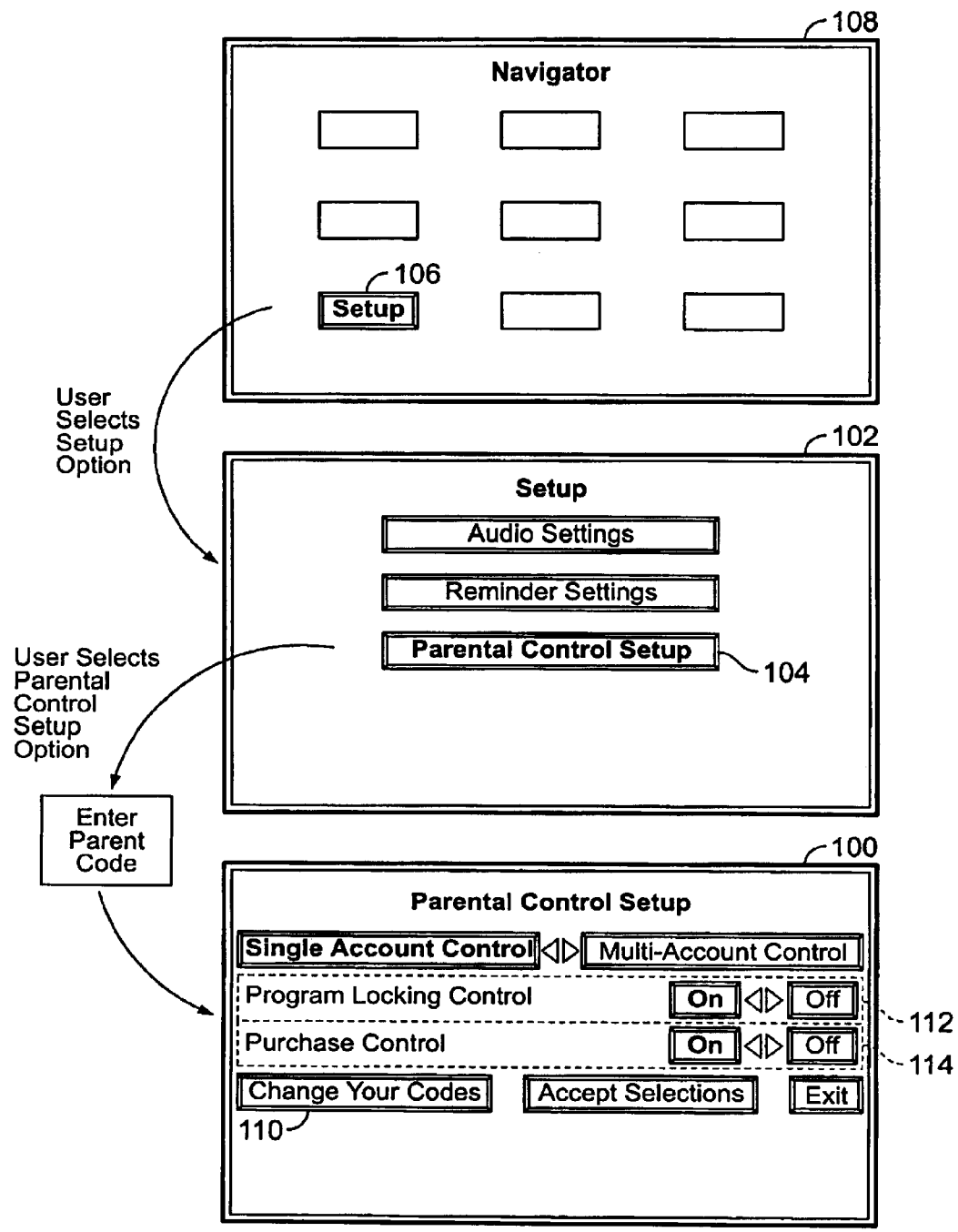
FIG. 2 is a diagram of an illustrative sequence of illustrative display screens for use in parental control setup in accordance with the present invention.

Parental control of programming may be activated from a setup menu. For example, program locking control or purchase control may be activated or deactivated from illustrative parental control setup display screen 100 of FIG. 2. Illustrative setup display screen 102 which includes parental control setup option 104 may be displayed when a user selects setup option 106 from illustrative navigator display screen 108. Parental control setup display screen 100 may be displayed when the user selects parental control setup option 104 and enters a parent program control code or a parent purchase control code. A parent program or purchase control code may be an alphanumeric code that is entered by the user with a remote control. A default program or purchase code may have been initially assigned in the system for a parent account.

Parental control setup display screen 100 includes an option for switching between single account or multi-account control. If desired, single account control or multi-account control may be automatically selected based on how many user accounts have been setup. From parental control setup display screen 100, a user may activate or deactivate parental control of programming 112 or purchasing 114. If desired, activation of parent control of programming or purchasing may be controlled automatically based on whether a program control code or a purchase control code has been set. Parental control setup display screen 100 may further include change your codes option 110.

Figure 3:
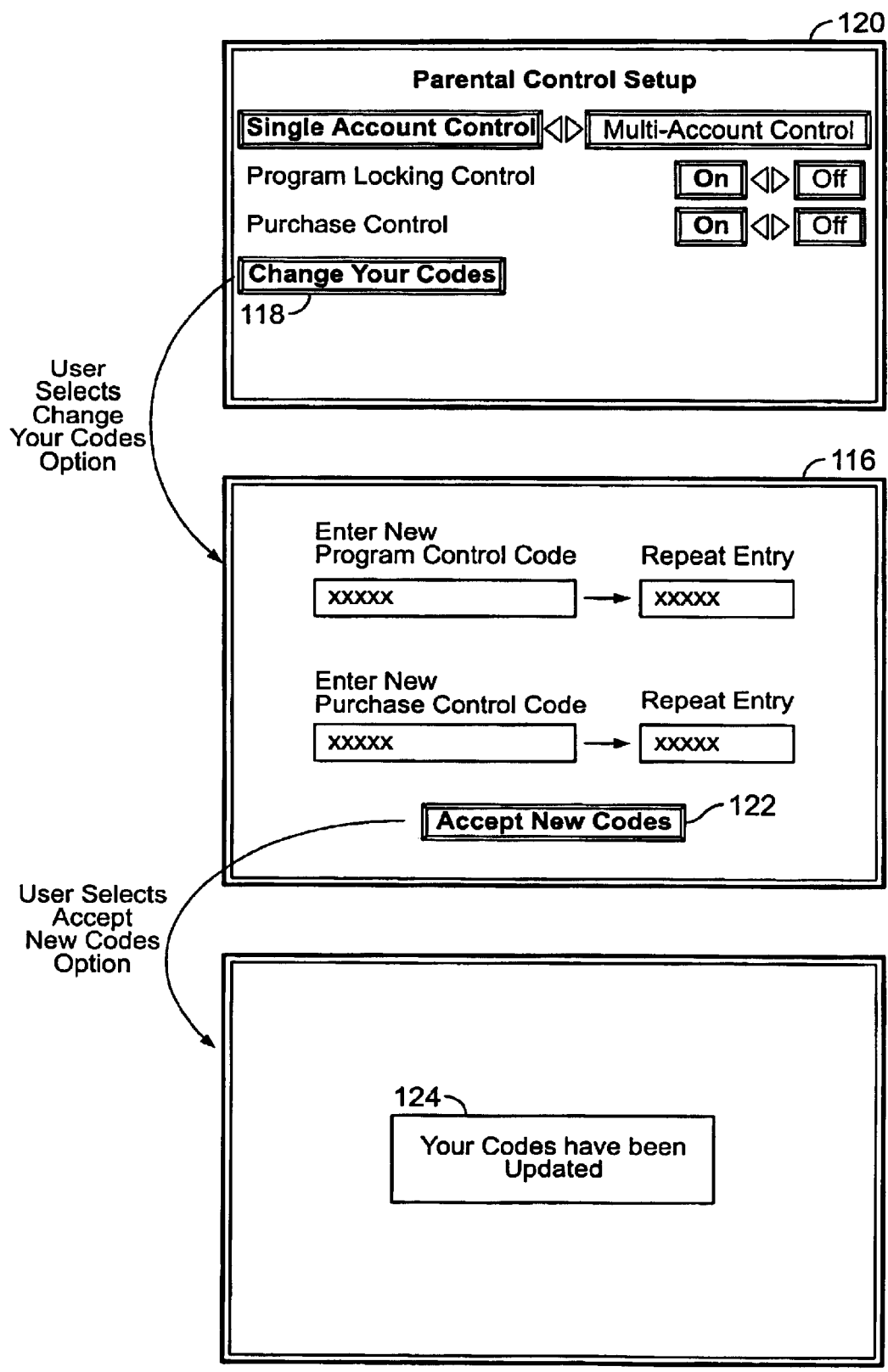
FIG. 3 is a diagram of an illustrative sequence of illustrative display screens for changing account codes in accordance with the present invention.

A change your codes option may provide a user with an opportunity to change the parental control codes. For example, illustrative new codes display screen 116 of FIG. 3 may be displayed when a user selects change your codes option 118 from illustrative parental control setup display screen 120. New codes display screen 116 may provide a user with an opportunity to enter a new program control code, a new purchase control code, or both. A user may enter a sequence of alphanumeric characters for each code and may be provided with an opportunity to confirm each new code (e.g., by re-entering the code). If desired, the alphanumeric characters that are entered may be blocked from being viewed on display screen 116 to protect the secrecy of the new code. New codes display screen 116 may include accept new codes option 122 which when selected causes a new program control code, purchase control code, or both to be defined in the system and an overlay 124 indicating that the codes have been updated to be displayed.

Figure 4A:
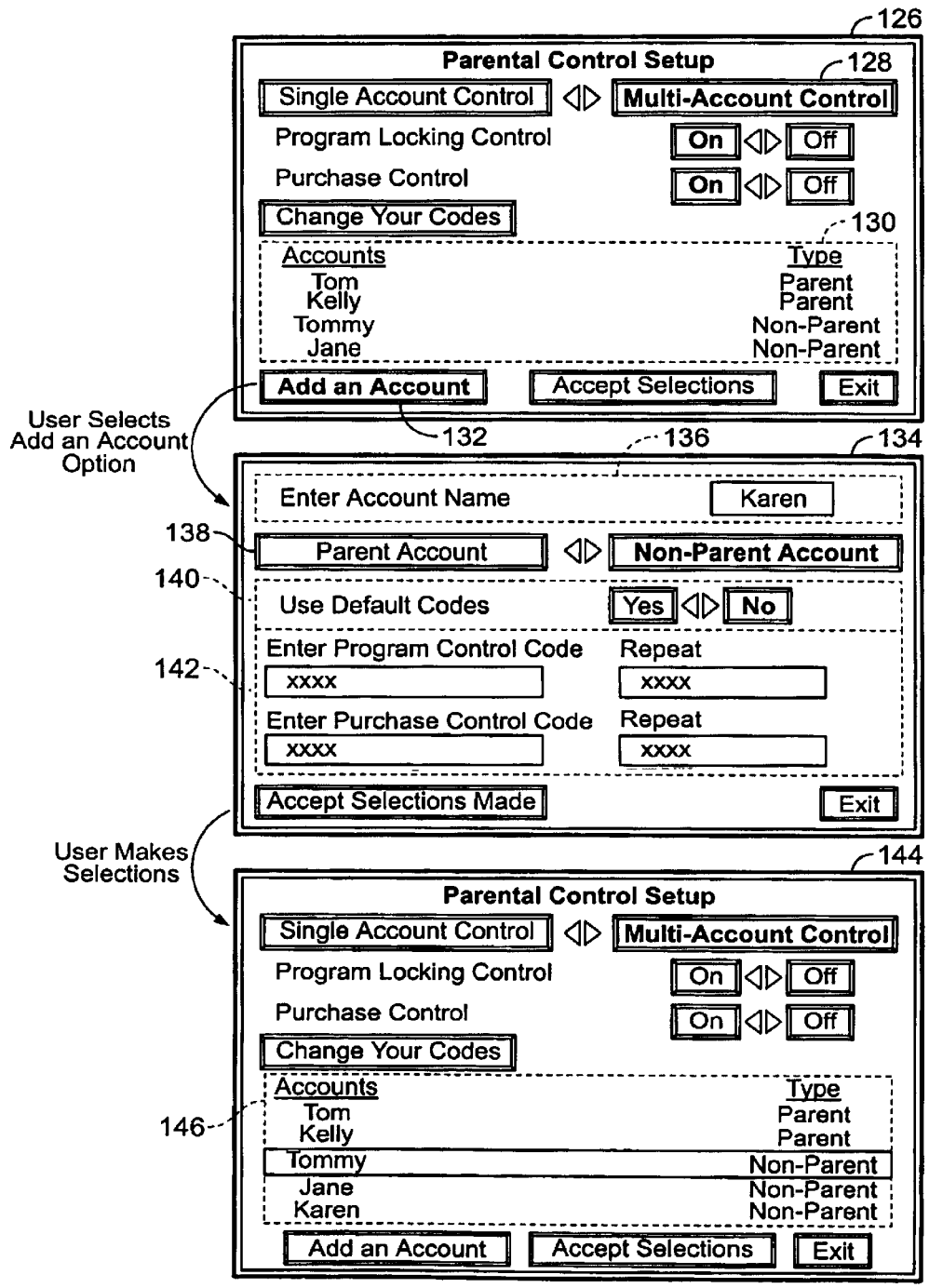
FIGS. 4a and 4b are diagrams of an illustrative sequence of illustrative display screens for controlling accounts in accordance with the present invention.

A user may be provided with an opportunity to setup multiple accounts. For example, illustrative parental control setup display screen 126 of FIG. 4a may provide a user with an opportunity to select multiple account control option 128. Parental control setup display screen 126 may include add an account option 132 for adding new accounts and account listings region 130 for displaying information related to existing accounts. Account listings region 130 may include account names, account types, etc. Illustrative account entry display screen 134 may be displayed when a user selects add an account option 132. Account entry display screen 134 may provide a user with an opportunity to enter an account name for the new account that is being added (enter account name option 136), to assign an account type (account type option 138), and to either select to use default codes for the account (default codes option 140) or enter code(s) for the new account (code entry option 142). After making and accepting selections in account entry display screen 136, a user may be returned to the initiating parental control setup display screen 144 which now has been updated to include a listing for the added account. There may be a maximum number of accounts based on system limitations.

Figure 4B:
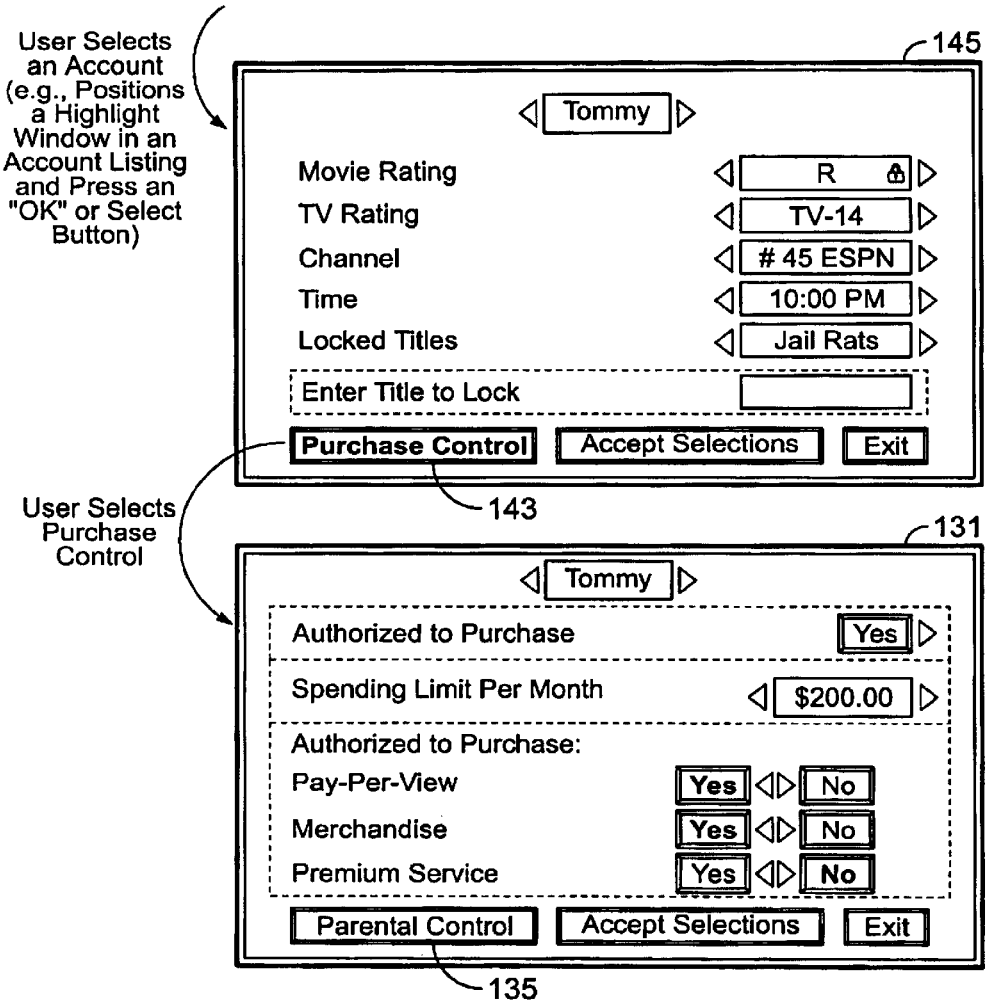

If desired, account listings in account listings region 146 may be selectable. A user may be allowed to position a highlight window over a particular listing and press an "OK" key of a remote control to select that listing. A display screen, such as parental control criteria display screen 145 of FIG. 4b, may be displayed to provide a user with the opportunity to view, modify, or delete the control settings for the selected account. If desired, display screen 145 may include purchase control option 143. A display screen, such as purchase control criteria display screen 131, may be displayed when the user selects purchase control option 143. Display screen 131 may provide the user an opportunity to set purchase control criteria for the selected account. Display screen 131 may include option 135 for allowing the user to access a parental control criteria display screen for that account (e.g., display screen 145). Access to a parental control criteria display screen and a purchase control criteria display screen may be automatically limited based on whether the user has selected to activate the program locking control option or the purchase control option, respectively. Techniques for controlling accounts and for accessing such display screens are further discussed below (e.g., see drawings and descriptions for FIGS. 7–16, 28, and 29).

Figure 5A:
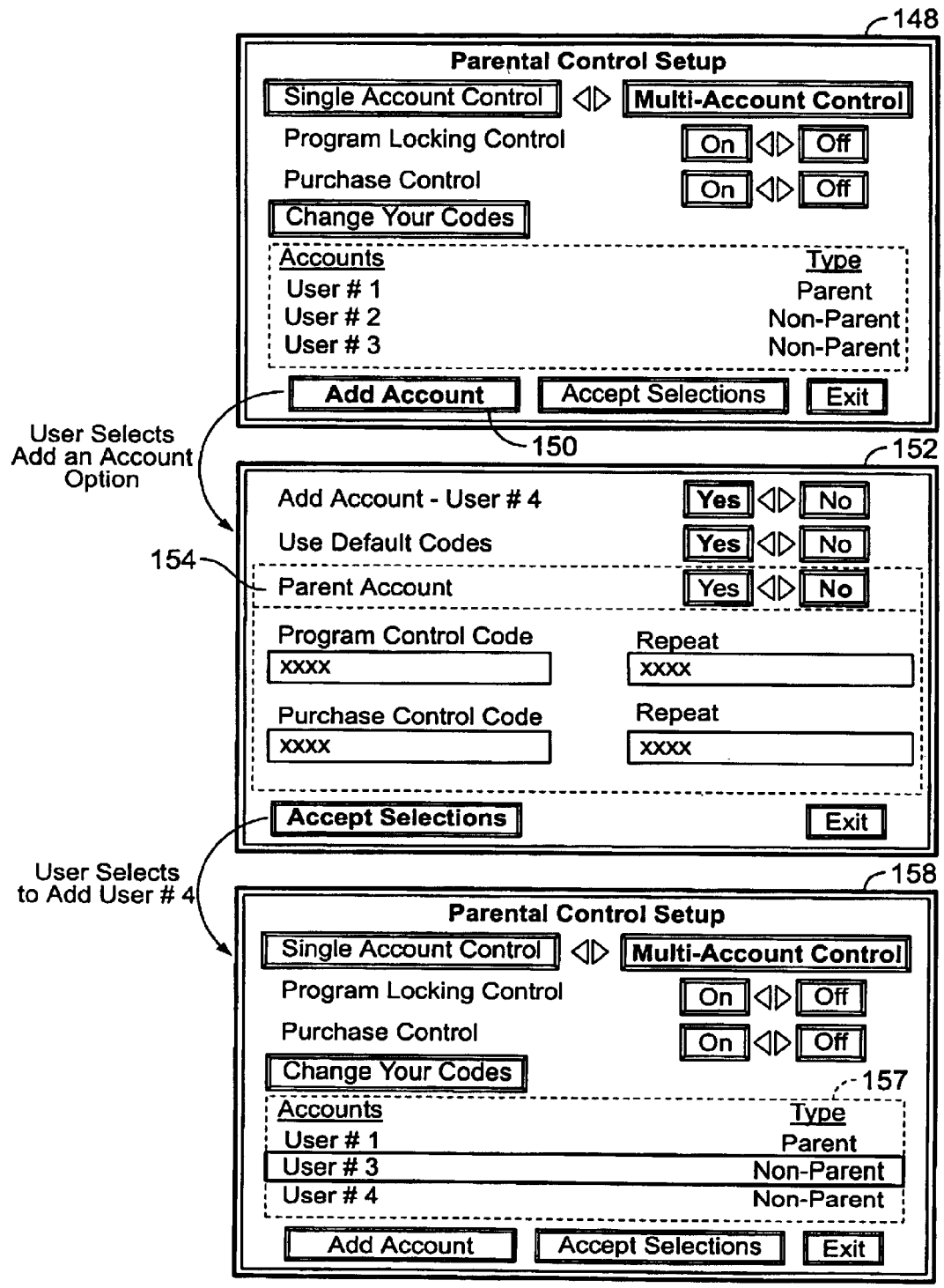
FIGS. 5a and 5b are diagrams of an illustrative sequence of illustrative display screens for controlling accounts in accordance with the present invention.

Account names may be predefined. For example, illustrative parental control setup display screen 148 of FIG. 5a includes a list of accounts with predefined names (User #1, User #2, and User #3). Illustrative account entry display screen 152 may be displayed when add account option 150 is selected. In account entry display screen 152, the name for the account to be added is automatically defined to be User #4.

Parent account option 154 may provide a user with an opportunity to set the account to be a parent account or a non-parent account (i.e., the account type). If desired, the interactive program guide system (hereinafter, program guide) may have only one parent account and may automatically set all new accounts to be non-parent accounts. The program guide may control purchasing and program viewing differently based on account types. If desired, a parent account may access all features of the guide and all programming where other accounts may have more limited access.

Figure 5B:
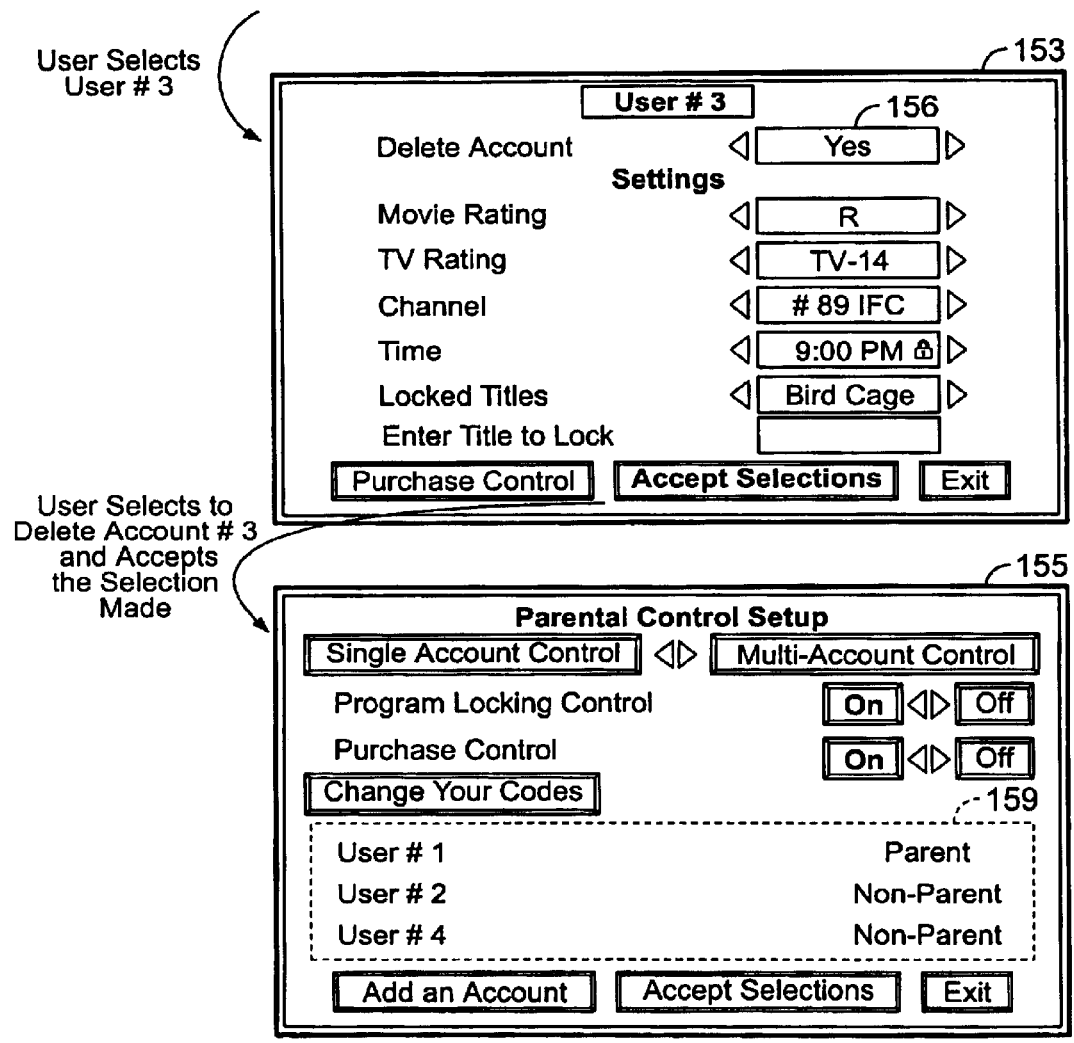

A user may be provided with an opportunity to delete an account. For example, display screen 153 of FIG. 5b having delete account option 156 may be displayed when a listing in account listing region 157 of parental control setup display screen 158 (FIG. 5a) is selected. Delete account option 156 may allow a user to delete the selected non-parent accounts (for example, the user toggles option 156 to "YES," positions a highlight region on the accept selections options, and presses a remote control key, such as an "OK" button). Account listings region 159 of illustrative parental control setup display screen 155 of FIG. 5b may be displayed without a listing for User #3 when a user selects to delete that account using delete account option 156.

Figure 6:
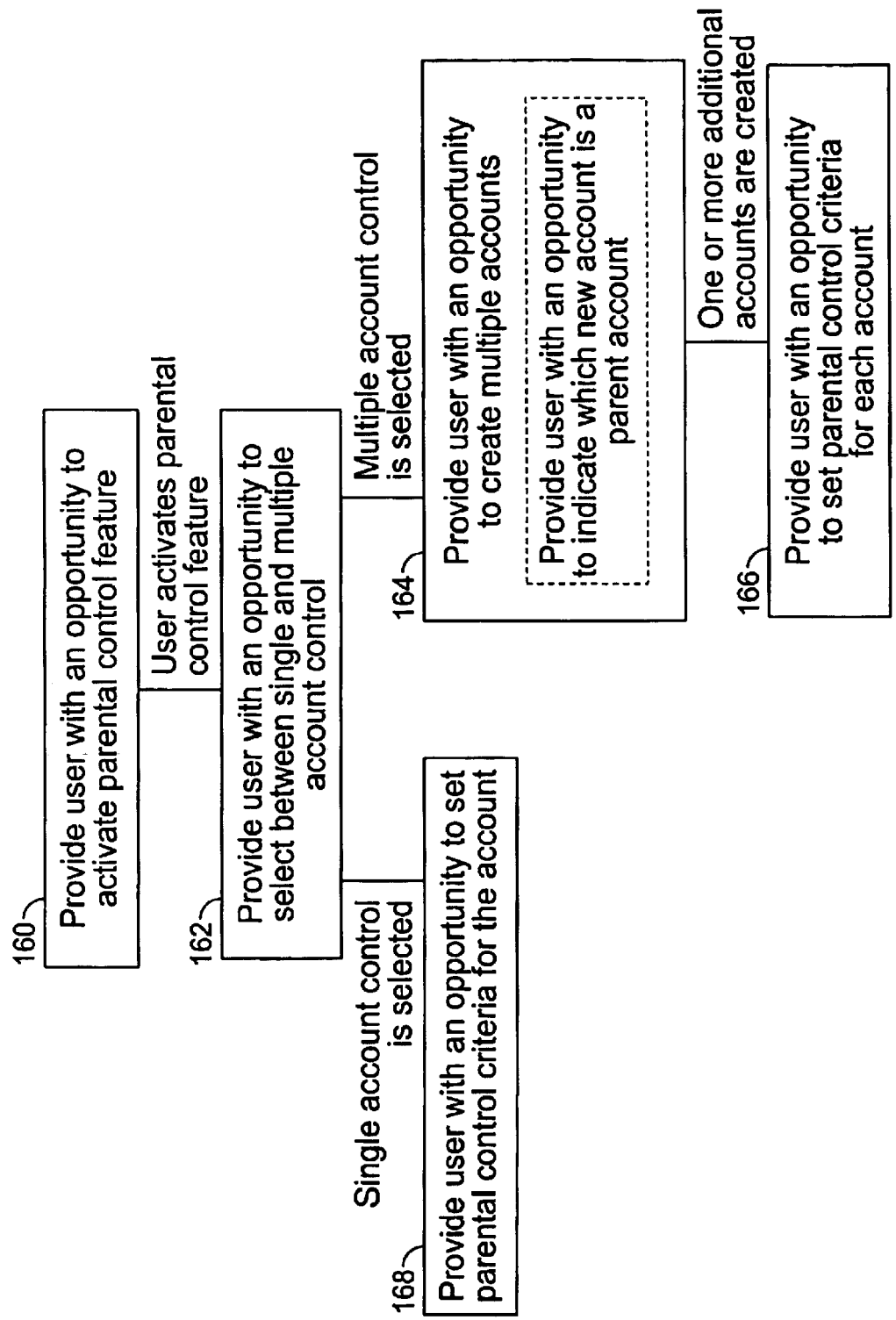
FIG. 6 is a flow chart of illustrative steps involved in providing multi-level parental control in accordance with the present invention.

Illustrative steps involved in providing multilevel parental control for use in an interactive program guide system, such as system 50 of FIG. 1a, are shown in FIG. 6. At step 160, a user may be provided with an opportunity to activate a parental control feature. At step 162, a user may be provided with an opportunity to select between single account control and multiple account control. If desired, the selection of single or multiple account control may be made automatically. At step 164, a user may be provided with an opportunity to create multiple accounts when a user selects multiple account control. Step 164 may include providing the user with an opportunity to indicate which one of the multiple accounts is a parent account. At step 166, a user may be provided with an opportunity to set a parental control criteria for each non-parent account. When a user selects single account control, a user may be provided with an opportunity to set parental control criteria for that single account at step 168. If desired, access to these steps may be limited to users who are parents by requiring that a user enter a parent account code before any or some of the steps.

Figure 7:
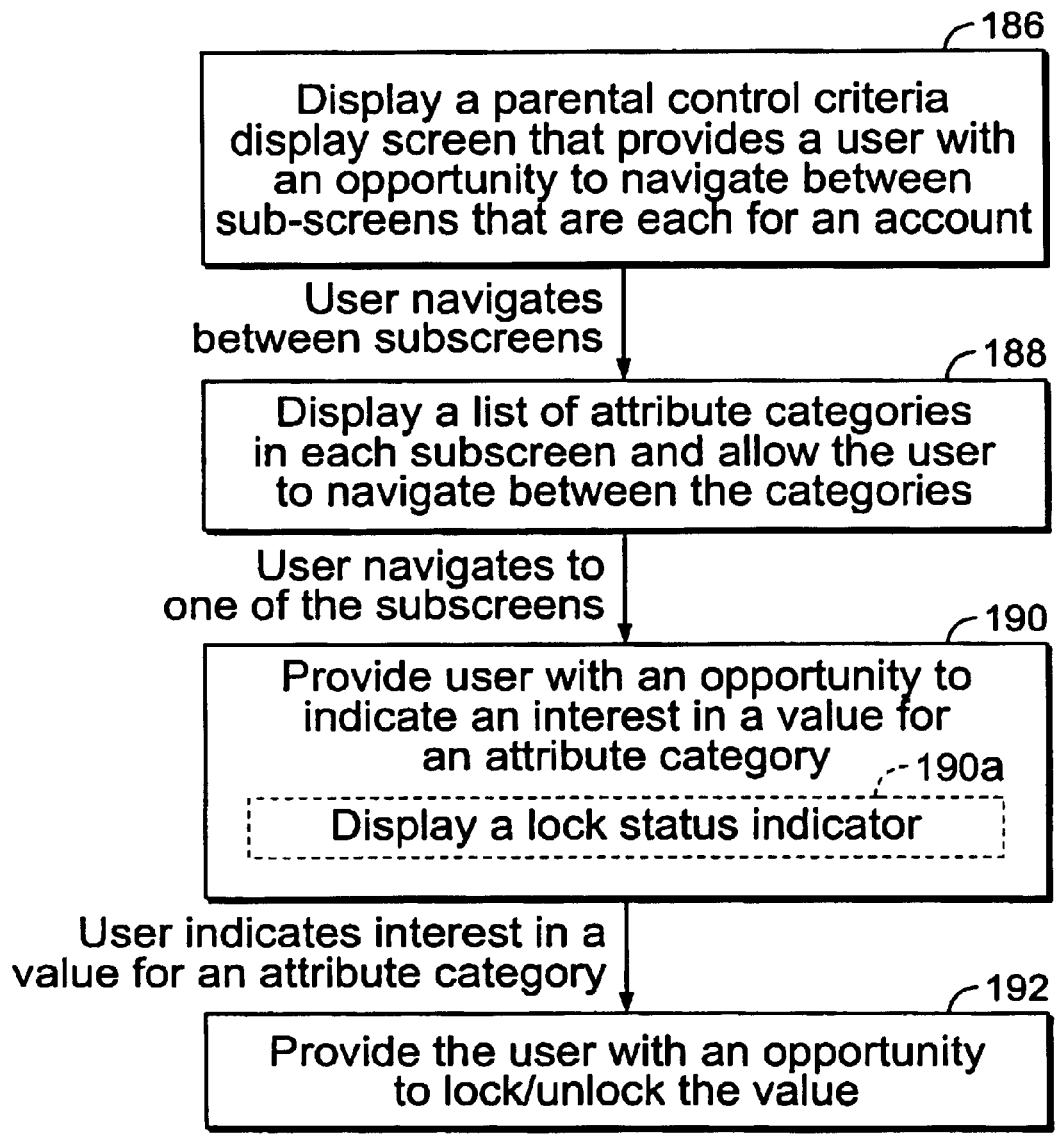
FIG. 7 is a flow chart of illustrative steps involved in setting parental program control criteria in accordance with the present invention.

Illustrative steps involved in setting parental program control criteria using subscreens for each account for use in an interactive program guide system, such as system 50 of FIG. 1a, are shown in FIG. 7. At step 186, a parental control criteria display screen may be displayed that provides a user with an opportunity to navigate between subscreens. Each subscreen may be for a different account. At step 188, a list of programming attribute categories may be displayed in each subscreen. Step 188 may include providing a user with an opportunity to navigate between attribute categories in a list. At step 190, a user may be provided with an opportunity to indicate an interest in a value for an attribute category. At step 190a, a locked status indicator may be displayed for an attribute value that has already been locked. At step 192, a user may be provided with an opportunity to lock or unlock the value.

Figure 8A:
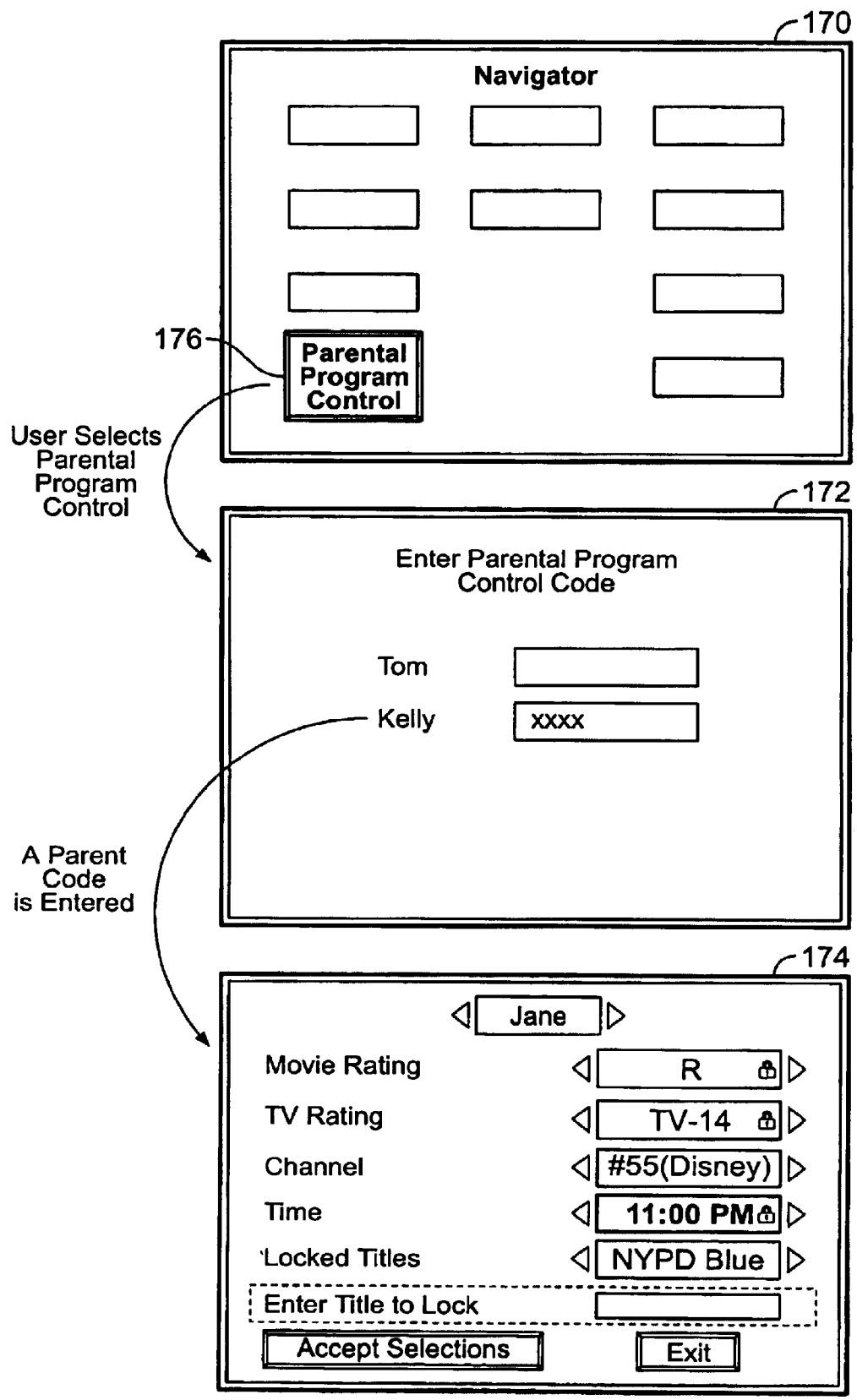
FIG. 8a is an illustrative sequence of illustrative display screens that is based on the illustrative steps of FIG. 7 in accordance with the present invention.
Figure 8B:
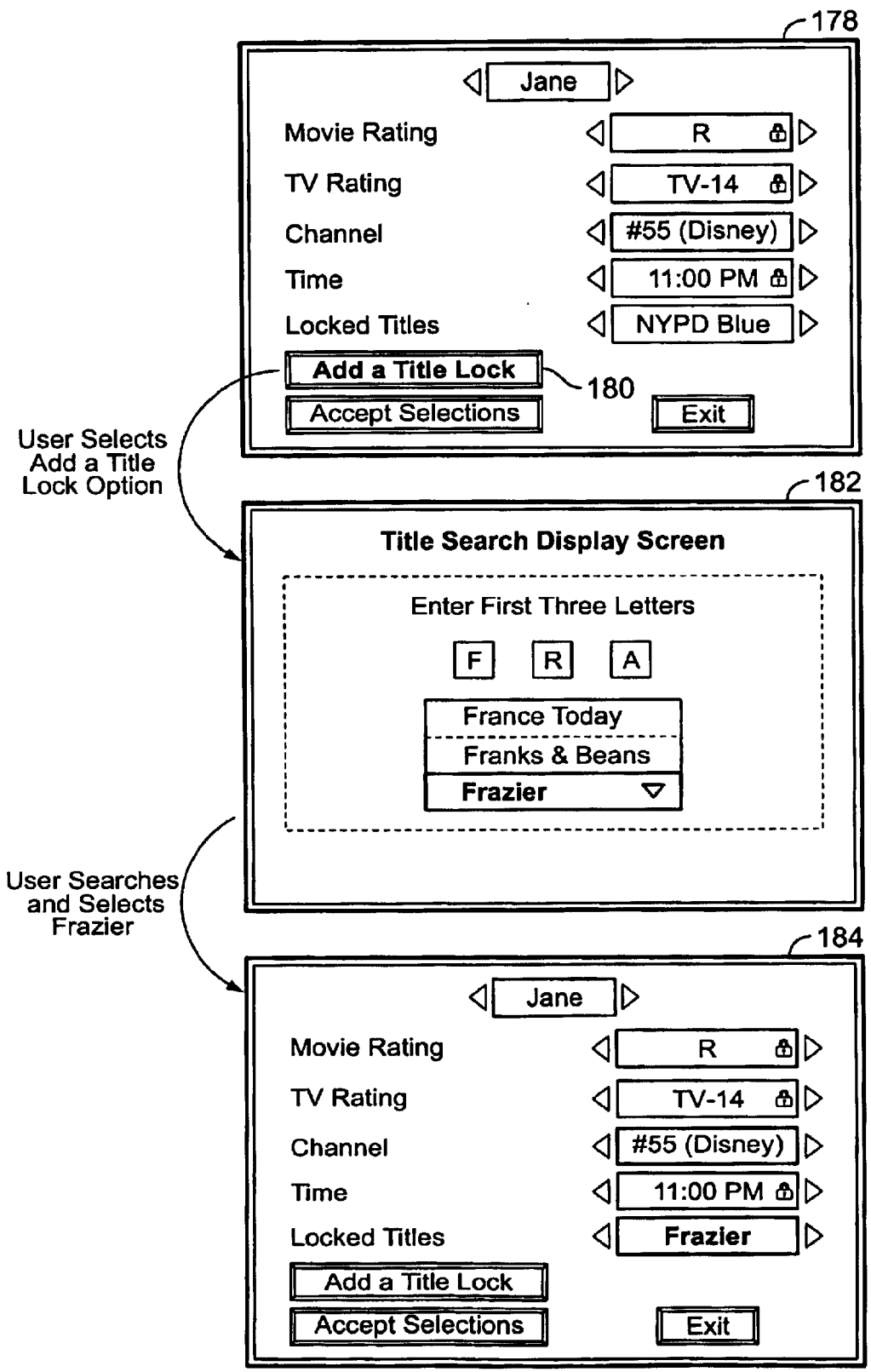
FIG. 8b is an illustrative sequence of illustrative display screens that is based on the illustrative steps of FIG. 7 in accordance with the present invention.

Illustrative navigator display screen 170, illustrative parental program code entry screen 172, and illustrative parental control criteria display screen 174 of FIG. 8a may be provided based on the illustrative steps of FIG. 7. Parental program code entry display screen 172 may be displayed when parental program control option 176 of navigator display screen 170 is selected. Parental program code entry display screen 172 may prompt for a program control code for a parent account. If desired, parental program code entry display screen 172 may be an overlay. When there are more than one parent account, parental program code entry display screen 172 may include the name for each parent account and a space next to each for code entry. Parental control criteria display screen 174 may be displayed when at least one parental program code is correctly entered.

Parental control criteria display screen 174 may provide a user with an opportunity to navigate between subscreens for each account by pressing a left or right arrow key on a remote control. Each subscreen may allow the user to select lock criteria for the account that is associated with that current subscreen. If desired, the program guide may limit the subscreen to non-parent accounts.

Within parental control criteria display screen 174, a user may navigate to individual programming attribute categories, such as movie rating, TV rating, channel, time, program title, etc. The user may navigate by pressing an up or down arrow key of a remote control to move a highlight region for an individual attribute category. When a highlight region is positioned on a particular attribute category, a user may select a value for that attribute category by pressing a left or right arrow key of a remote control. As each attribute value is displayed, an indicator, such as a lock icon, may be displayed to show whether that particular attribute value has already been locked for the selected account (the account which has its subscreen currently displayed). A particular attribute value may be toggled between locked and unlocked by pressing a lock or data entry key on the remote control when the highlight region is positioned on that attribute value.

For some program attributes, such as program titles, other techniques may be used to enter an attribute value to lock. For example, as shown in parental control criteria display screen 174, a user may be provided with an opportunity to enter the title of a program using alphanumeric character entry (e.g., using a keyboard).

If desired, a parental control criteria display screen may include an option for adding a title lock. For example, illustrative parental control criteria display screen 178 of FIG. 8b may include add a title lock option 180. Illustrative title search display screen 182 may be displayed when add a title lock option 180 is selected. Title search display screen 182 may provide a user with an opportunity to search for programs using the first three letters of the program title. Examples of systems with program title searching are described in U.S. Pat. No. 5,629,733 and Knudson et al. U.S. patent application Ser. No. 09/357,941, filed Jul. 16, 1999, which are hereby incorporated by reference herein in their entireties. A user may add a title to a list of locked titles by selecting a program title that was found in a program title search (e.g., by positioning a highlight window on the program title "Frazier" and pressing a lock or data entry key). The program guide may then display parental control criteria display screen 184 with a newly added title (e.g., "Frazier") highlighted.

Figure 9:
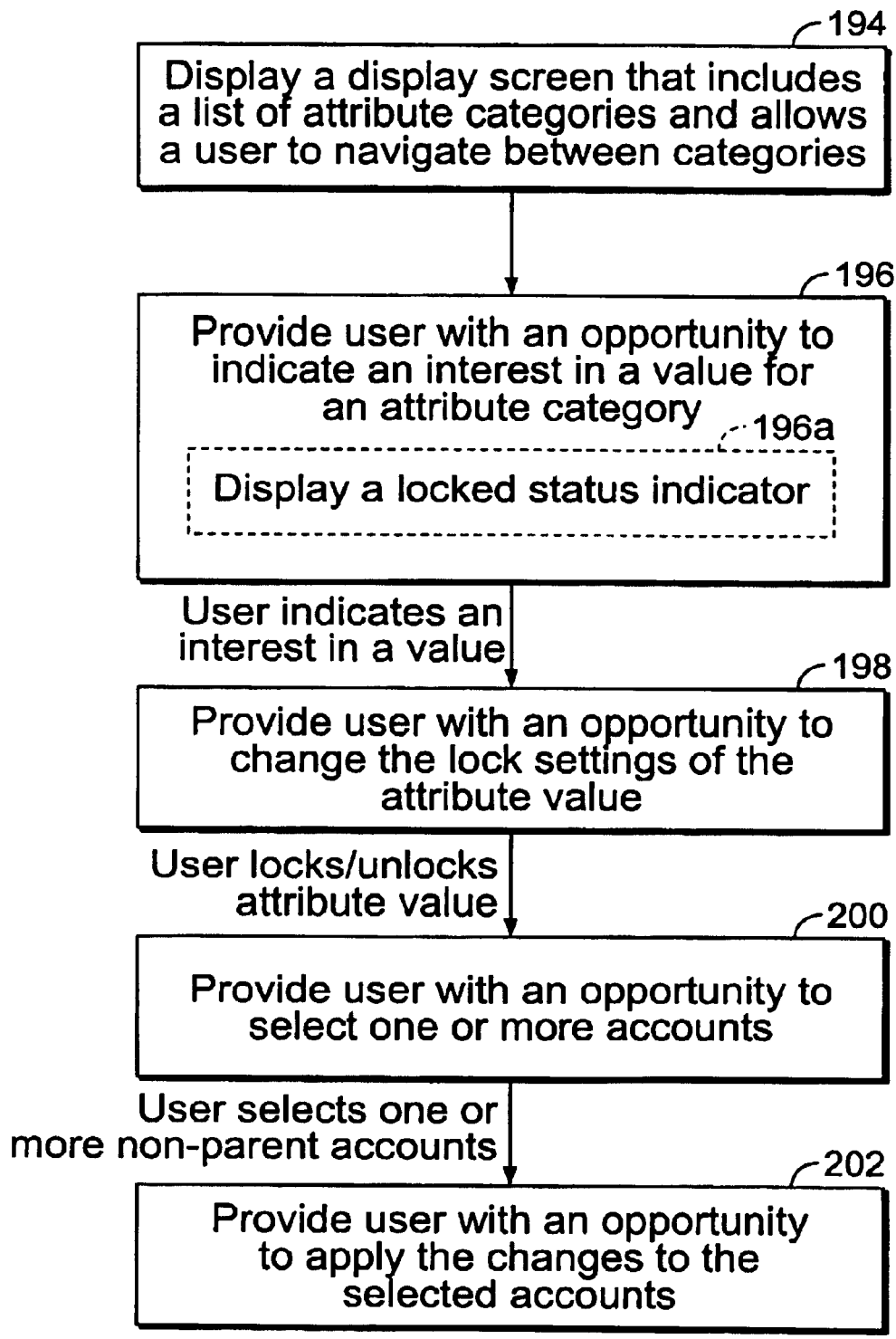
FIG. 9 is a flow chart of illustrative steps involved in setting parental program control criteria without using sub-screens in accordance with the present invention.

Illustrative steps involved in setting parental control criteria without the use of subscreens for an interactive program guide system, such as system 50 of FIG. 1a, are shown in FIG. 9. At step 194, the program guide may display a parental control criteria display screen that includes a list of attribute categories and provides a user with an opportunity to navigate between attribute categories. At step 196, a user may be provided with an opportunity to indicate an interest in a value for an attribute category. At substep 196a, a locked status indicator may be displayed for an attribute value that has already been locked. At step 198, a user may be provided with an opportunity to change the lock setting of attribute values. At step 200, a user may be provided with an opportunity to select one or more accounts. If desired, step 200 may be provided when the user has completed making desired changes to the lock settings. At step 202, a user may be provided with an opportunity to apply the changes to the accounts that have been selected when the opportunity to select accounts was provided.

Figure 10A:
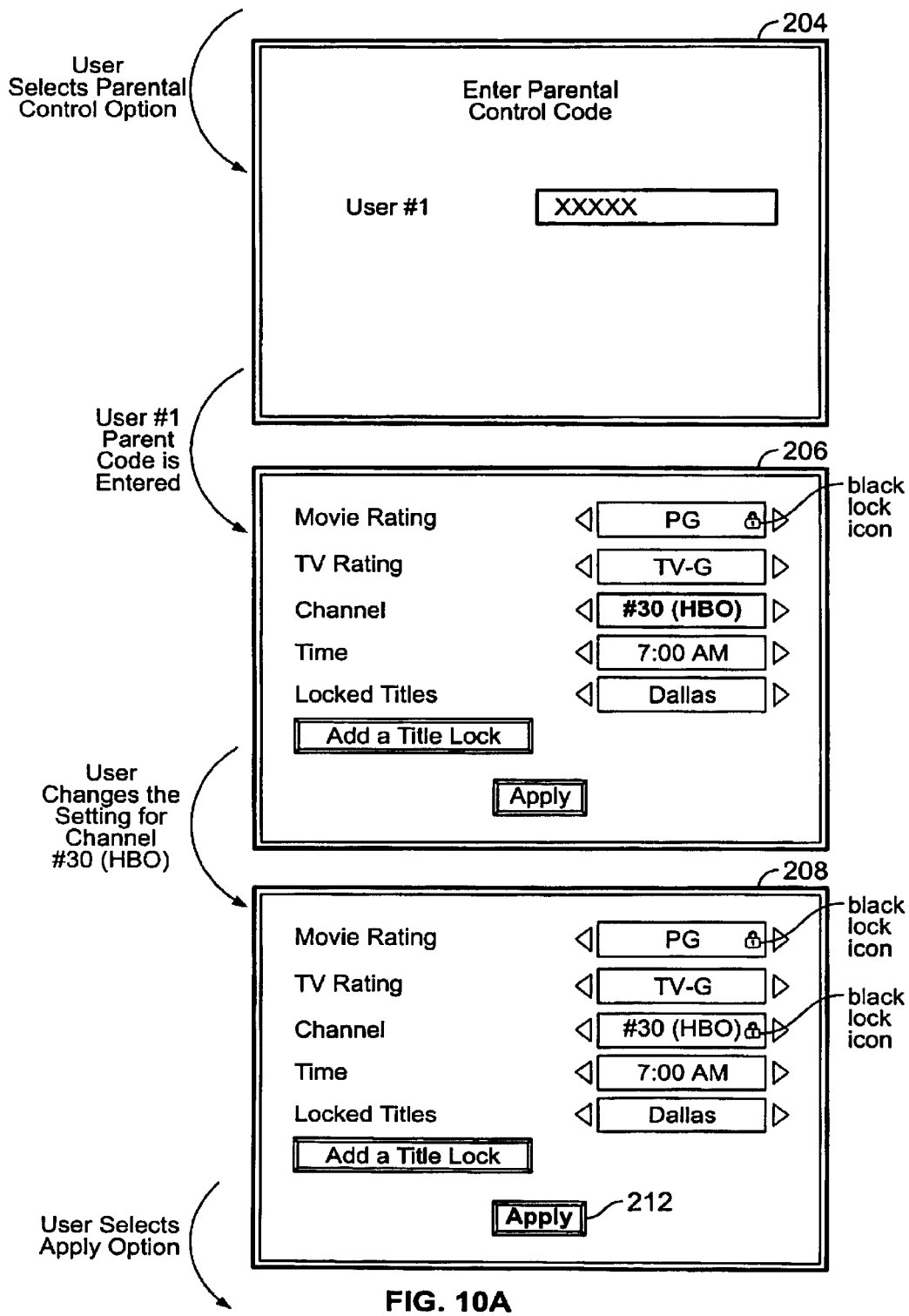
FIG. 10a is a diagram of an illustrative sequence of illustrative display screens that is based on the illustrative steps of FIG. 9 in accordance with the present invention.
Figure 10B:
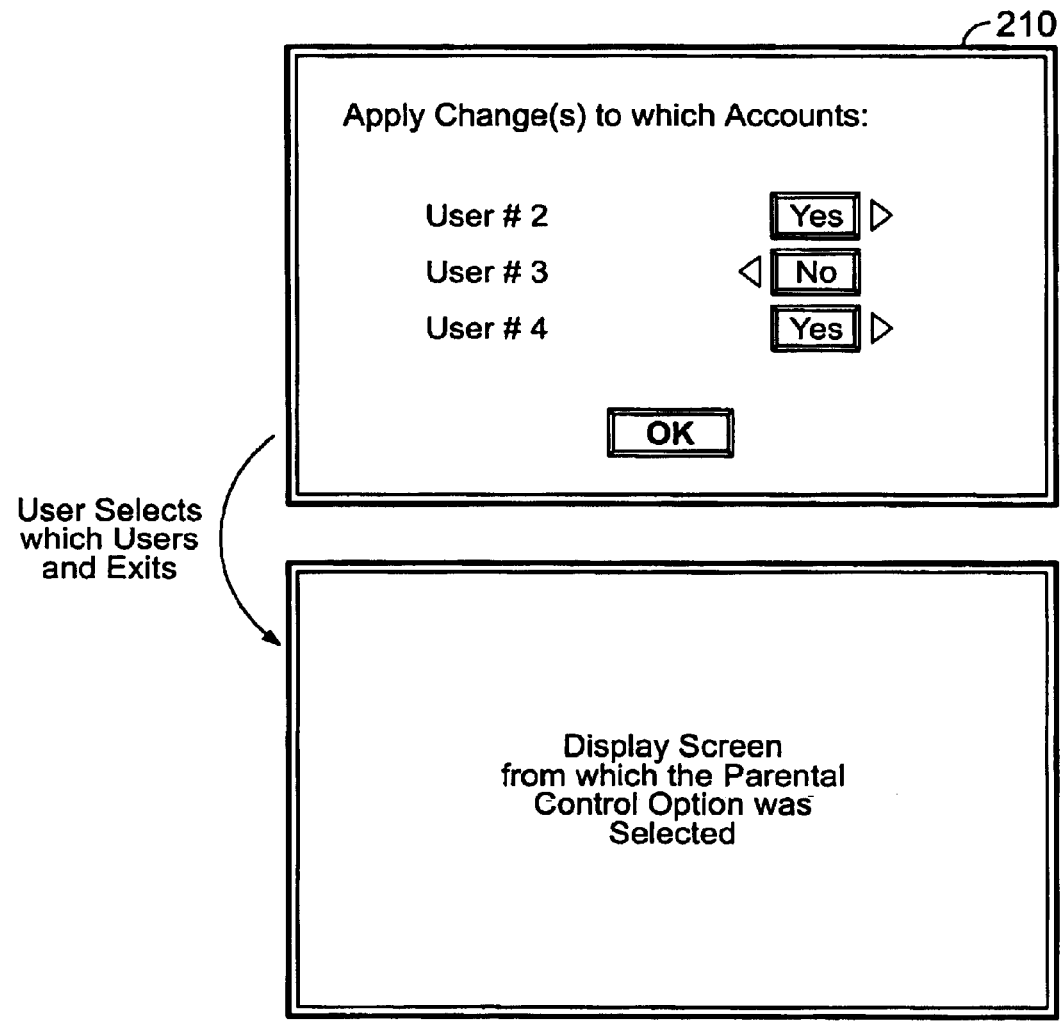
FIG. 10b is a diagram of an illustrative sequence of illustrative display screens that is based on the illustrative steps of FIG. 9 in accordance with the present invention.

Illustrative display screens 204, 206, 208, 210, and 212 of FIGS. 10a and 10b may be provided based on the illustrative steps shown in FIG. 9. Illustrative parental program control code display screen 204 may be displayed when a user selects a parental program control option. Illustrative parental control criteria display screen 206 may be displayed when a user enters a valid parent program code. Parental control criteria display screen 206 may include a list of attribute categories and attribute values. A user may be allowed to move a highlight region between attribute category and to move between the range of attribute values that are available for each category. Parental control criteria screen 206 may include lock icons to indicate whether a particular attribute value is locked in any account. The lock icons may vary to reflect for how many of the accounts that particular attribute value is locked. A lock icon that is black in color (e.g., a black lock icon) may indicate that a particular attribute value has been locked for all of the accounts. A lock icon that is in a different color (e.g., a grey lock icon) may indicate that a particular attribute value has been locked for at least one account but not for all of the accounts. Illustrative parental control criteria display screen 208 may be displayed when a user navigates in parental control criteria display screen 206 to the channel category, navigates to Channel #30 (HBO), and presses a lock or data entry key to change the setting for Channel #30 (HBO) from no locked accounts to all accounts being locked. Parental control criteria display screen 208 includes a lock icon that is associated with Channel #30 (HBO) to indicate the new lock status for Channel #30. Parental control criteria display screen 20b includes a grey lock icon for the PG-13 attribute. The setting for PG-13 may be changed to be either locked for all accounts (e.g., black icon) or locked for none of the accounts (e.g., no icon). To change the setting for an attribute value that has a grey lock icon, the user may, for example, use a data entry or lock key to change the setting to all accounts locked, change the setting to no accounts locked, or to return the setting to its original grey lock setting unchanged.

Illustrative select account display screen 210 of FIG. 10b may be displayed when a user selects apply option 212 of parental control criteria display screen 208. Select account display screen 210 includes a list of accounts with an option for each account that provides the user with an opportunity to select the accounts to which the changes in the lock settings (e.g., locking Channel #30) should be applied.

Figure 11:
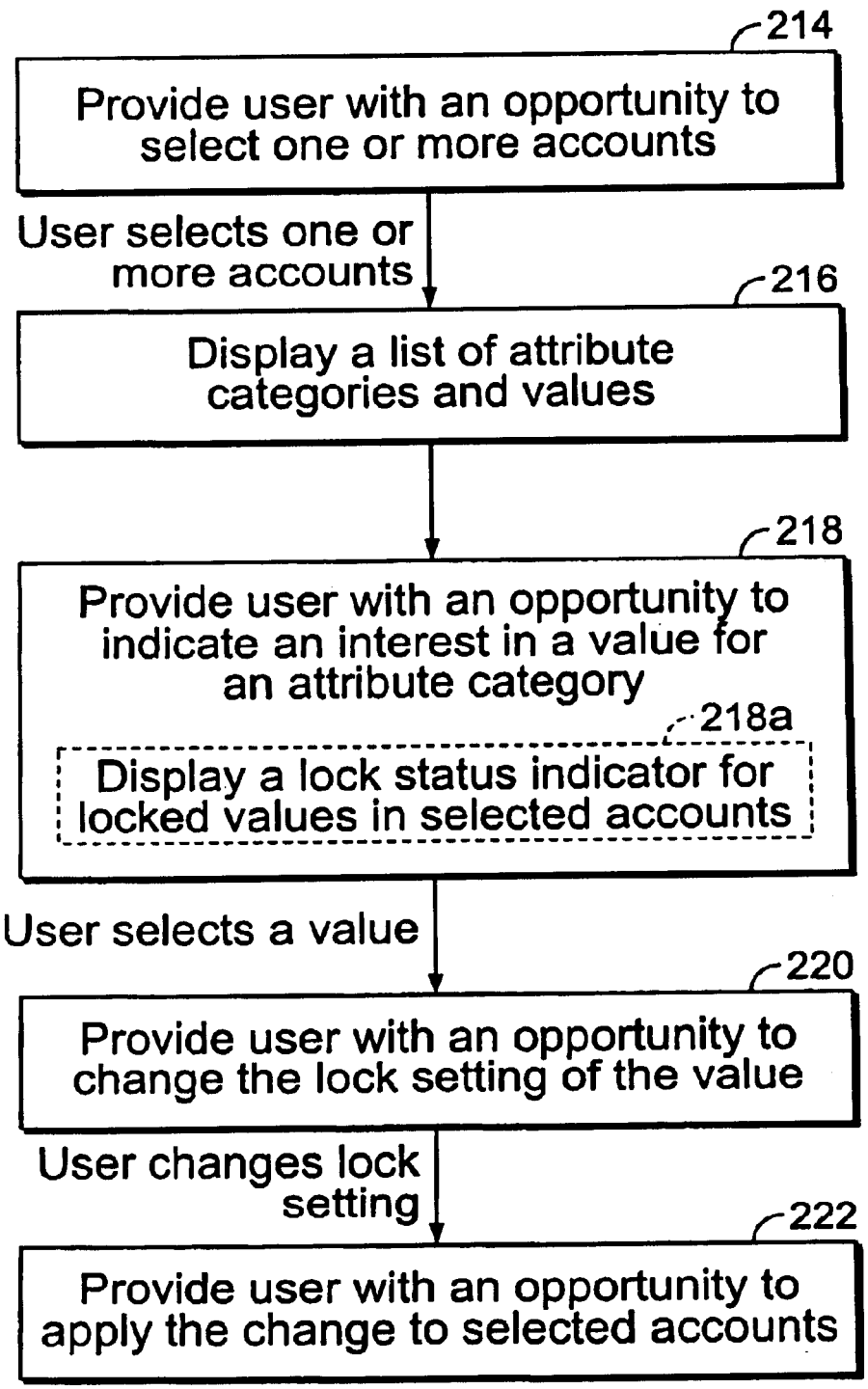
FIG. 11 is a flow chart of illustrative steps involved in setting parental control criteria by first selecting accounts in accordance with the present invention.

Illustrative steps involved in setting parental control criteria by first selecting accounts for use in an interactive program guide system, such as system 50 of FIG. 1a, are shown in FIG. 11. At step 214, a user may be provided with an opportunity to select one or more accounts. At step 216, a parental control criteria display screen having a list of attribute categories and attribute values may be displayed when a user selects one or more accounts. At step 218, a user may be provided with an opportunity to indicate an interest in a value for an attribute category. At substep 218a, a lock status indicator may be displayed for attribute values that are locked for the selected accounts. At step 220, a user may be provided with an opportunity to change the lock setting of a selected value. At step 222, a user may be provided with an opportunity to apply the change in lock setting to the earlier selected accounts.

Figure 12:
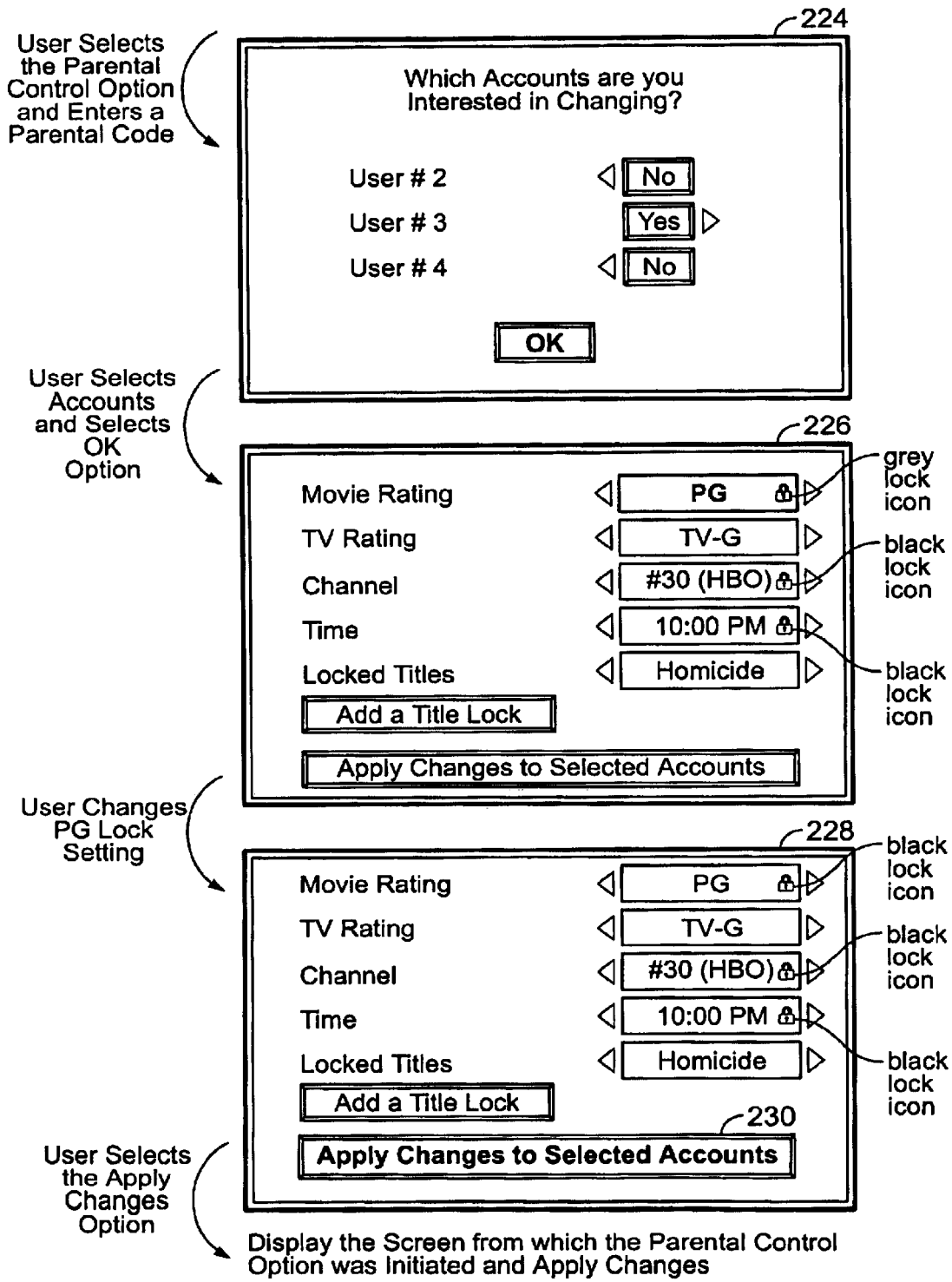
FIG. 12 is a diagram of an illustrative sequence of illustrative display screens that is based on the illustrative steps of FIG. 11 in accordance with the present invention.

Illustrative display screens 224, 226, and 228 of FIG. 12 may be provided based on the illustrative steps of FIG. 11. Illustrative select account display screen 224 may be displayed when a user selects a parental control option and enters a parent program code. Illustrative parental control criteria display screen 226 may be displayed when a user selects one or more accounts using options that are provided in select account display screen 224. A user may be allowed to change lock settings for attribute values while parental control criteria display screen 226 is displayed. Lock icons that are displayed in parental control criteria display screen 226 may indicate whether a particular attribute value is locked for the selected accounts. A black lock icon may indicate that a particular attribute value is locked for all of the selected accounts. A grey lock icon may indicate that a particular attribute value is locked for at least one account but not for all of the selected accounts. Parental control criteria display screen 226 includes a grey lock icon for the PG attribute value. A user may navigate to the PG value and press a data entry or lock key to change the setting to be locked for all selected accounts (e.g., a black lock icon). Pressing the key again may change the setting of the PG value to be unlocked for all of the selected again. A user may then press the key again to return the setting to its original setting. Changes to the lock setting may be applied to the selected accounts when a user selects apply changes option 230. If desired, the changes may be applied when the user changes the setting for each attribute value.

Other icon shapes, colors or status indicators may also be used to reflect lock settings. Other techniques for changing the lock settings may also be used. For example, a display screen may include the name of each account that is locked for a particular attribute value next to where that attribute value is displayed on the screen.

Figure 13:
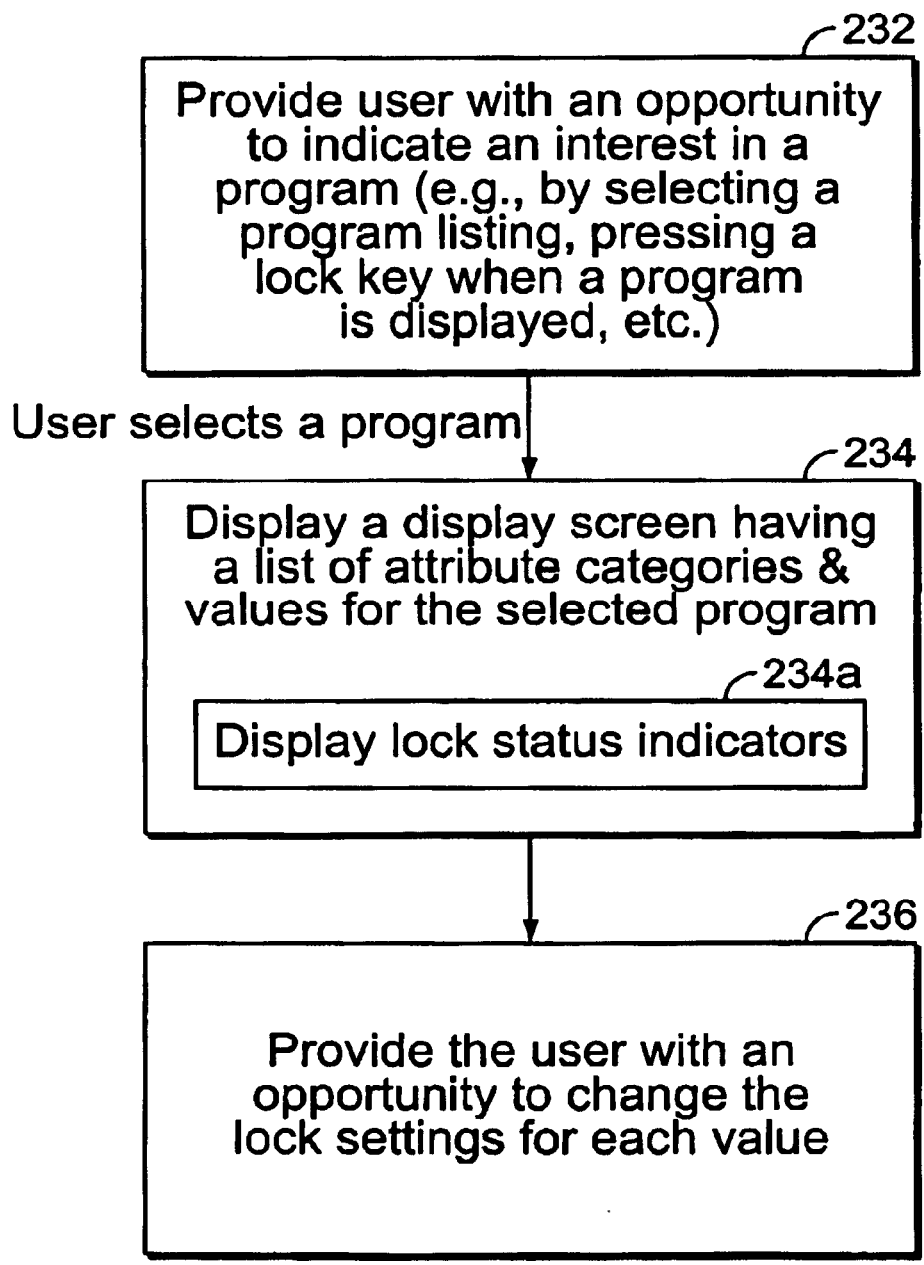
FIG. 13 is a flow chart of illustrative steps involved in setting parental control criteria by example in accordance with the present invention.

Illustrative steps involved in setting parental control criteria by example for use in an interactive program guide system, such as system 50 of FIG. 1a, are shown in FIG. 13. At step 232, a user may be provided with an opportunity to indicate an interest in a program (e.g., by selecting a program listing, by pressing a lock key when a program is displayed, by selecting a parental control option from a program information display screen, etc.). At step 234, a display screen may be displayed that includes a list of attribute categories and values for the program of interest. At substep 234a, lock status indicators may be displayed for the attribute values in the list that are locked for any account. At step 236, a user may be provided with an opportunity to change lock settings for the attribute values. If desired, a user may select to which accounts the changes are to be applied by using parental control criteria display subscreens or using an account select display screen before or after changes in lock settings are made.

Figure 14:
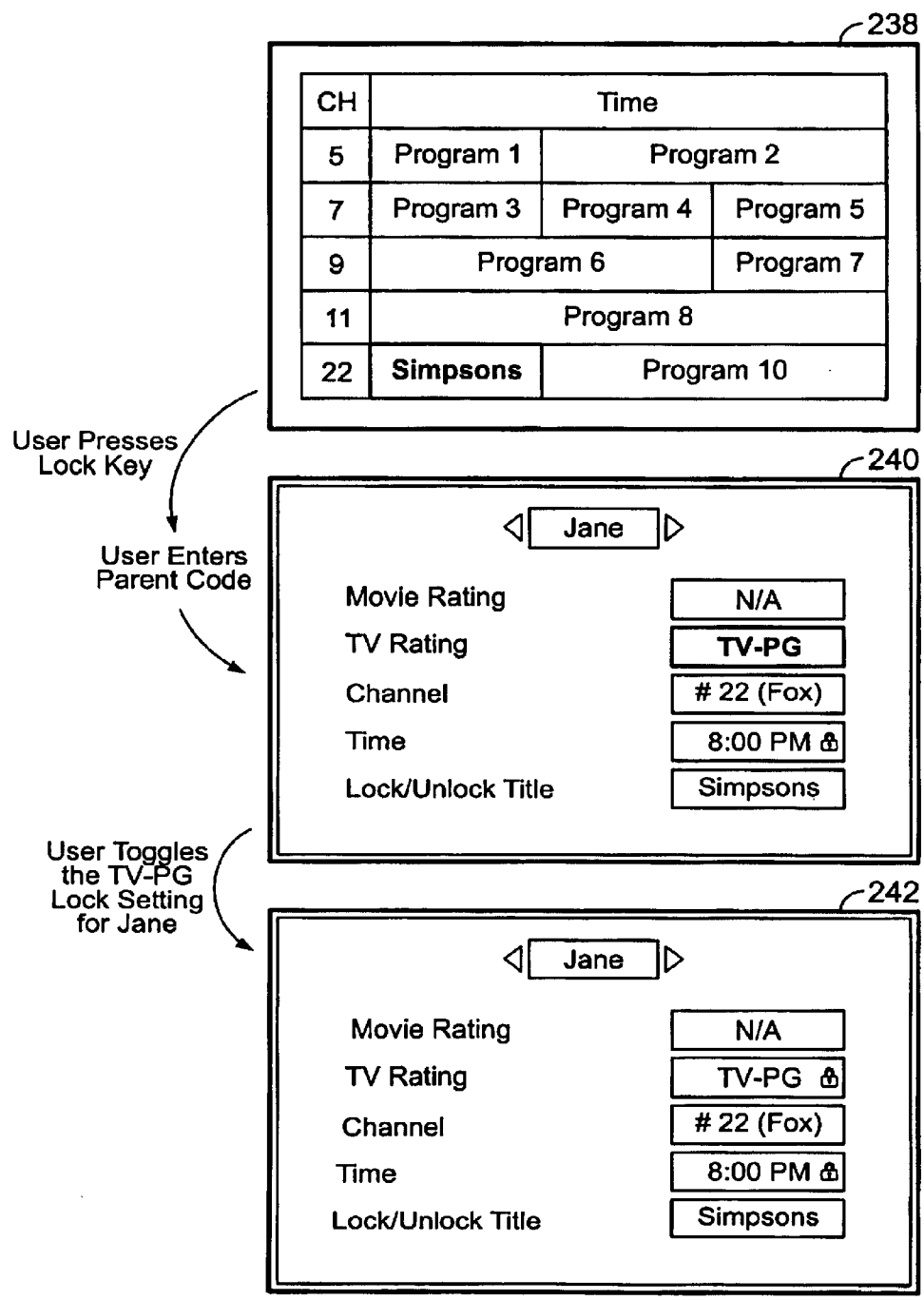
FIG. 14 is a diagram of an illustrative sequence of illustrative display screens that is based on the illustrative steps of FIG. 13 in accordance with the present invention.

Illustrative program listings display screen 238 and illustrative parental control criteria display screens 240 and 242 of FIG. 14 may be provided based on the illustrative steps shown in FIG. 13. Parental control criteria display screen 240 may be displayed when a user selects a program listing (e.g., "Simpsons") from program listings display screen 238 and enters a parent program code. Parental control criteria display screen 240 may provide a user with an opportunity to navigate between subscreens where each subscreen is for a different account and includes a list of program attribute categories and the attribute category values for the selected program. If desired, the attribute values may be fixed so that a user may not be allowed to navigate to other attribute values for a category. Parental control criteria display screen 242 may be displayed with a lock icon being shown for the TV-PG television rating when a user selects to lock the TV-PG television rating in parental control criteria display screen 248. The change in lock setting is applied to the account that is associated with the current subscreen (e.g., the account for Jane).

Figure 15:
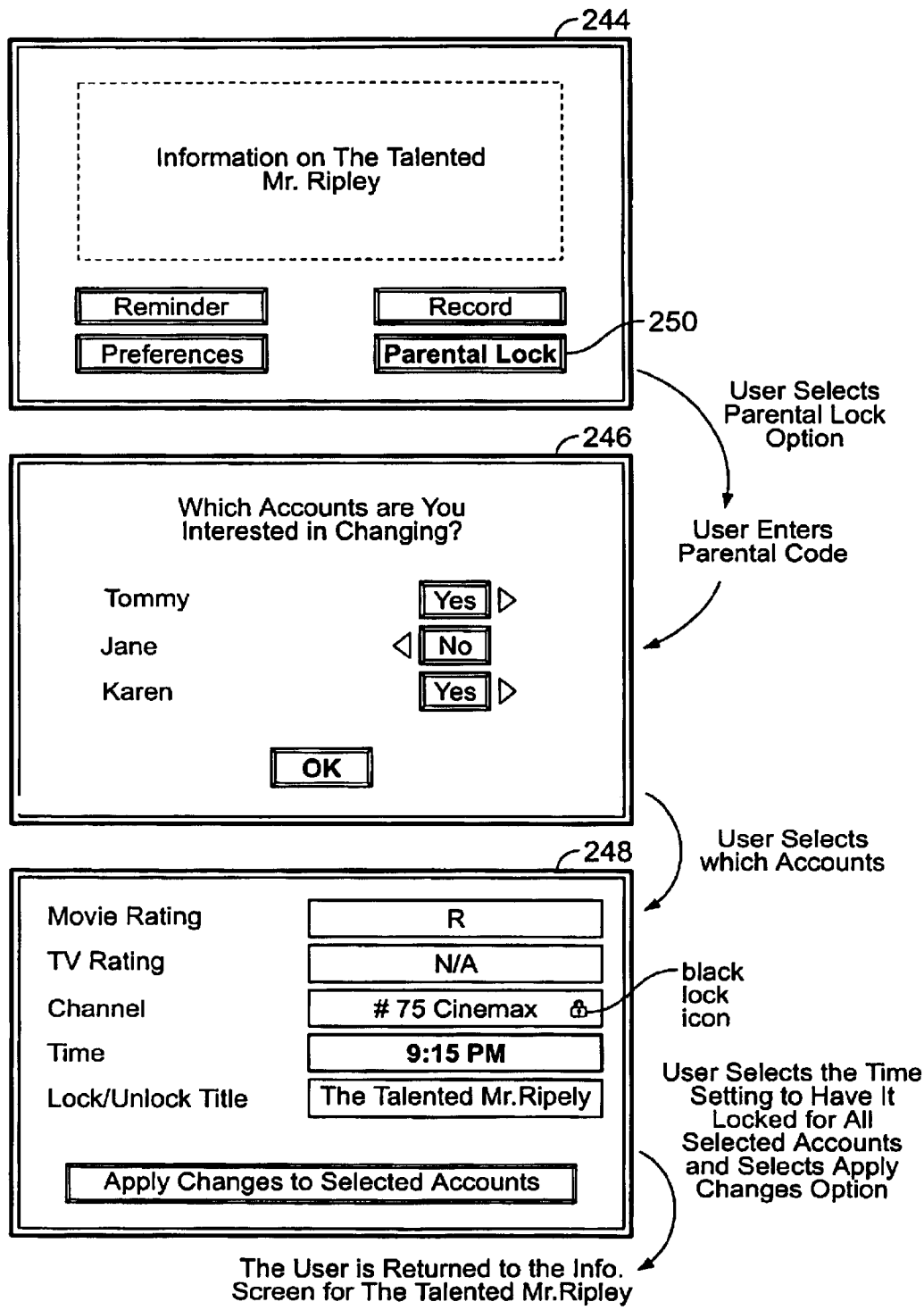
FIG. 15 is a diagram of an illustrative sequence of illustrative display screens that is based on the illustrative steps of FIG. 13 in accordance with the present invention.

Illustrative information display screen 244, illustrative select account display screen 246, and illustrative parental control criteria display screen 248 of FIG. 15 may be displayed based on the illustrative steps of FIG. 13. Program information display screen 244 may have been displayed to provide information and options that are related to a particular program. Select account display screen 246 may be displayed when a user selects parental lock option 250 of program information display screen 244. The lock settings for accounts that are selected using account select display screen 246 may be changed using parental control criteria display screen 248. Parental control criteria display screen 248 includes a list of attribute categories and values for the program that was associated with program information display screen 244. Parental control criteria display screen 248 may allow the user to change the lock setting for attribute values and to apply the changes to the selected accounts.

Figure 16:
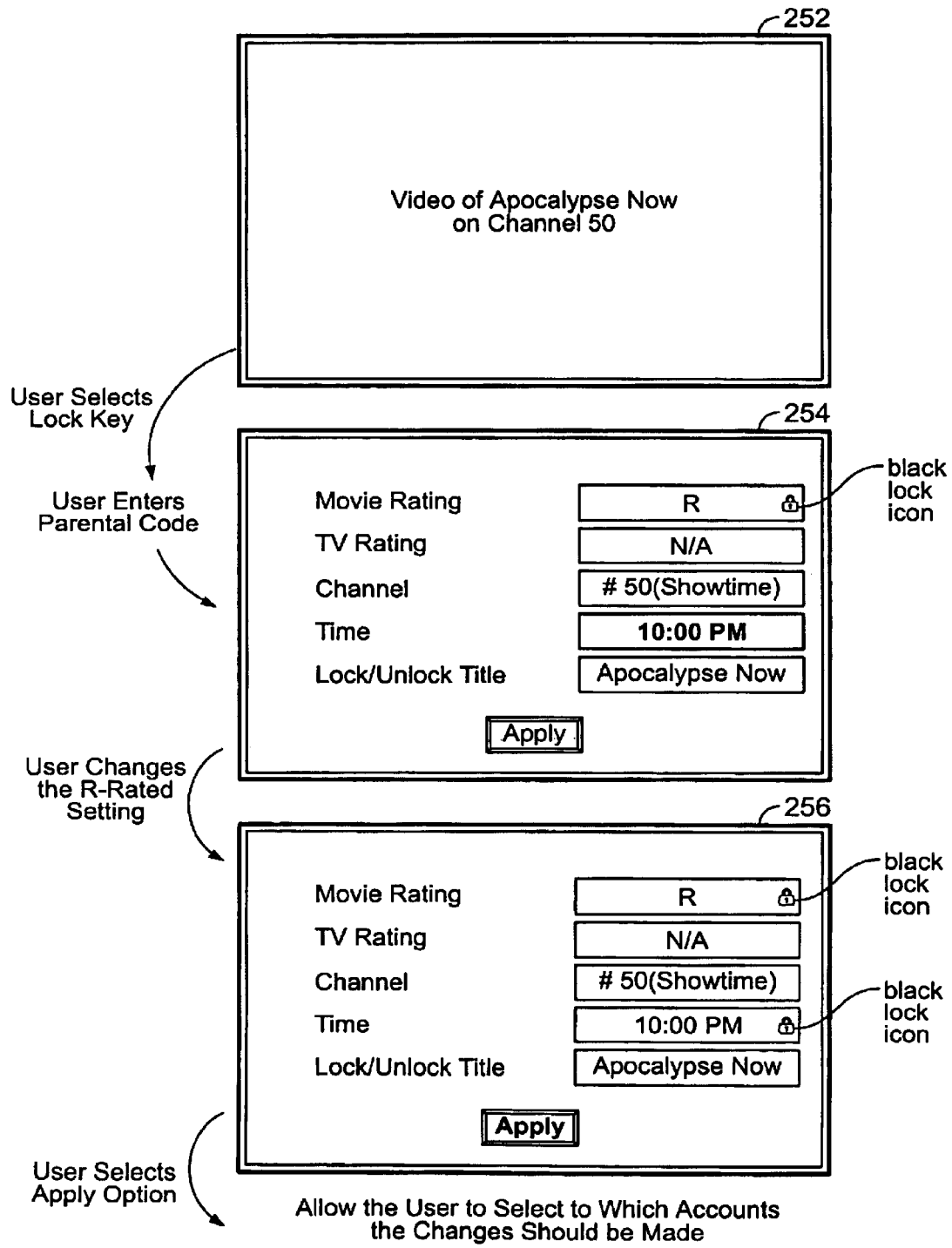
FIG. 16 is a diagram of an illustrative sequence of illustrative display screens that is based on the illustrative steps of FIG. 13 in accordance with the present invention.

Illustrative program display screen 252 and illustrative parental control criteria display screens 254 and 256 of FIG. 16 may be displayed based on the illustrative steps of FIG. 13. Parental control criteria display screen 254 for locking attributes of a particular program (e.g., "Apocalypse Now") may be displayed when a user enters a valid parental program code after pressing a lock key while video for that particular program was being displayed. A user may then change lock settings using the attribute values that are displayed for that particular program (e.g., a user may set a 10:00 p.m. lock setting). When a user has finished making desired changes, the user may be provided with an opportunity to select to which accounts the changes should be applied.

Figure 17:
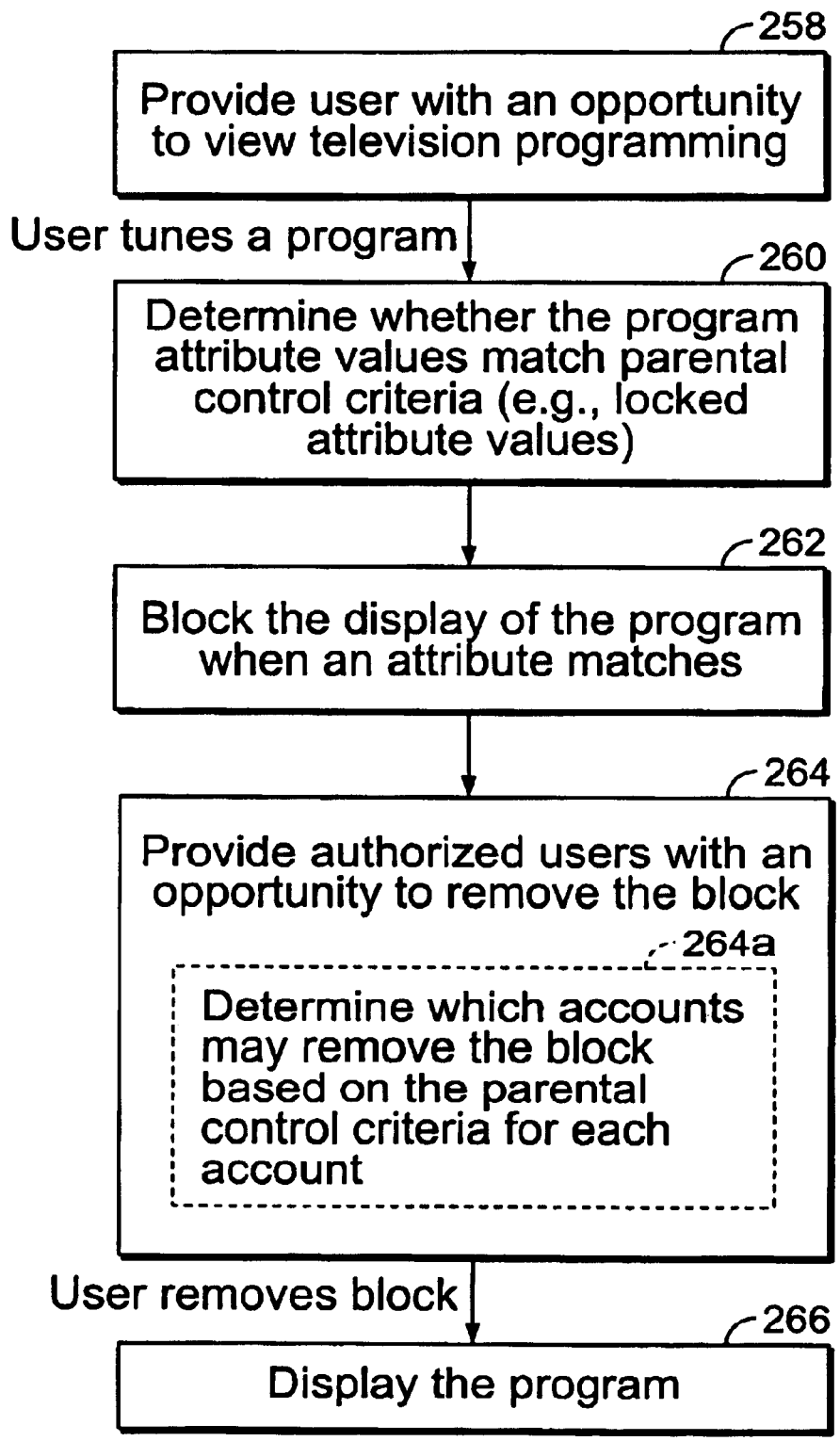
FIG. 17 is a flow chart of illustrative steps involved in controlling program viewing based on parental control criteria in accordance with the present invention.

Illustrative steps involved in controlling program viewing based on parental control criteria for use in an interactive program guide system, such as system 50 of FIG. 1, are shown in FIG. 17. At step 258, a user may be provided with an opportunity to view television programming. When a user tunes to a particular program to view, the program guide (at step 260) may determine whether the attribute values for that program match parental control criteria (e.g., locked attribute values). At step 262, the display of video for that particular program may be blocked when there is an attribute match. If desired, the program guide will block the audio and video of the program. At step 264, users who should be allowed to view that particular program may be provided with an opportunity to remove the block. At substep 264a, the program guide may determine which accounts may remove the block based on the parental control criteria (e.g., locked attributes) for each account. At step 266, video for that particular program may be displayed and audio for of that particular program may be played when the user removes the block.

For each attribute value that is locked, there may be a list of users who are authorized to view programming that have the locked attribute value. For example, in a system that has a parent account and two-nonparent accounts for Tom and Karen, a parent may have selected to lock R-rated movies for Karen and to lock Channel #50 for Tom. Illustrative lock list 268 of FIG. 18a for Tom, Karen, and parent accounts show parent and Tom to be authorized to view R-rated movies which are locked for Karen and shows parent and Karen to be authorized to view Channel #50 which is locked for Tom. If desired, the list may only include information that is related to active locks.

Figure 18A:
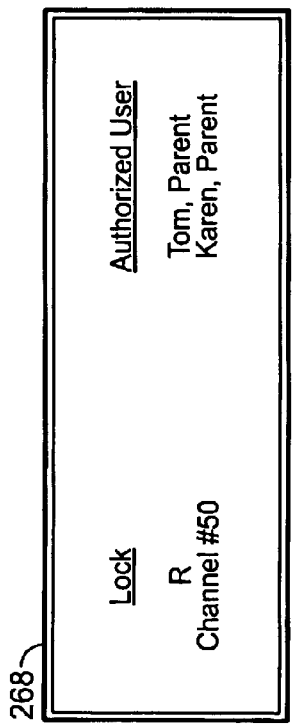
FIG. 18a is a diagram of an illustrative lock list in accordance with the present invention.
Figure 18B:
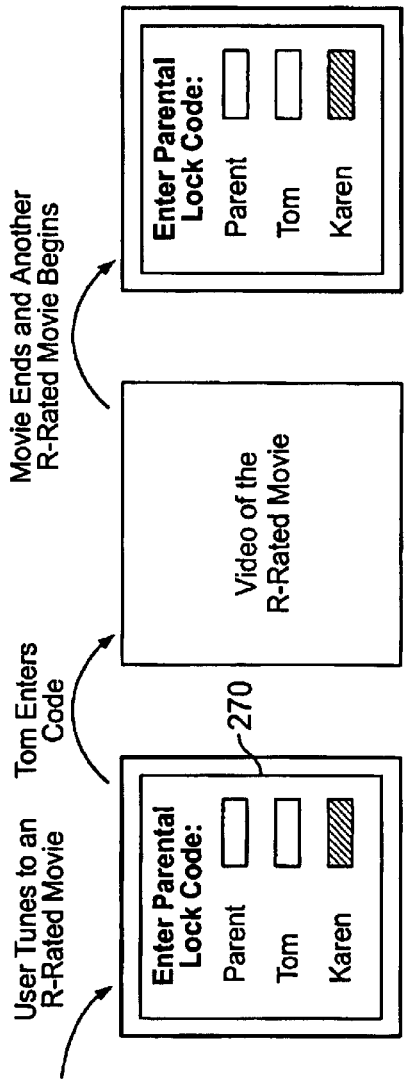
FIG. 18b is a diagram of an illustrative sequence of illustrative display screens that is based on the illustrative lock list of FIG. 18a in accordance with the present invention.

The illustrative sequence of illustrative display screens that is displayed in FIG. 18b may be provided based on illustrative lock list 268 of FIG. 18a. Illustrative code entry overlay 270 may be displayed to block from view video of an R-rated movie which has just been tuned. Overlay 270 may prompt for the entry of a program control code. Overlay 270 may include account names for authorized users and a space next to each name to prompt for the entry of a program control code for that account.

Figure 18C:
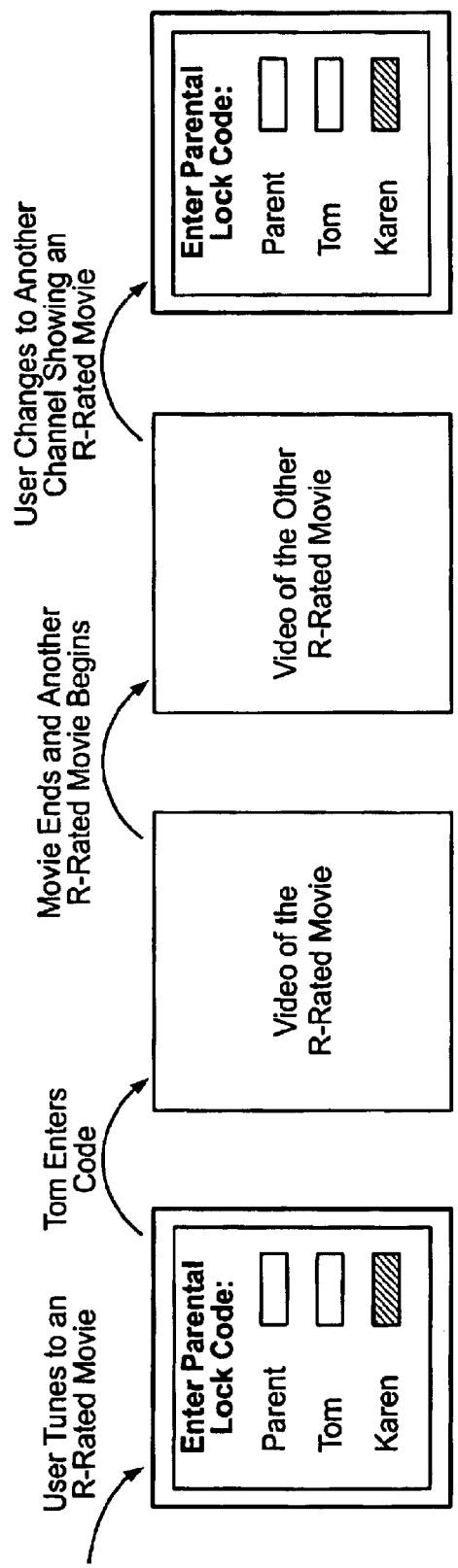
FIG. 18c is a diagram of an illustrative sequence of illustrative display screens that is based on the illustrative lock list of FIG. 18a in accordance with the present invention.

Account names for users who are not authorized may be included in overlay 270, but they may be displayed in a way that makes it clear that code entry is not allowed. When an account code for an authorized user account is entered, video of the blocked program may be displayed. When another R-rated movie begins on the same channel, the program guide may block the program and may display overlay 272 to again require that an authorized user log in (e.g., enter a valid program control code). If desired, as shown in FIG. 18c, the program guide may continue to allow viewing (e.g., displays video for the second R-rated movie) as long as the channel is not changed.

One of the advantages of this technique is that to view parentally controlled programming, an authorized user may simply enter a code to show that the user is present without requiring users to log in to the system.

Figure 19A:
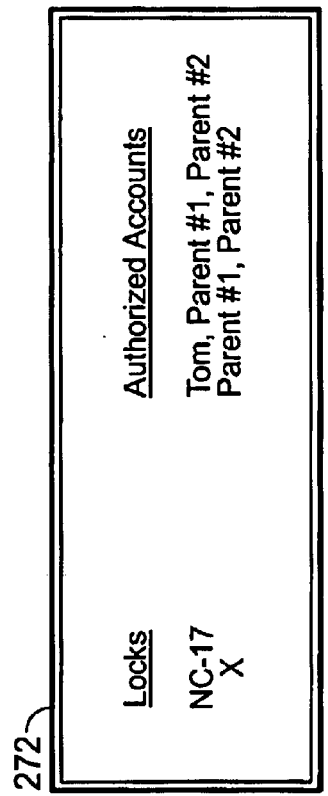
FIG. 19a is a diagram of an illustrative lock list in accordance with the present invention.
Figures 19B, 19C, 19D:
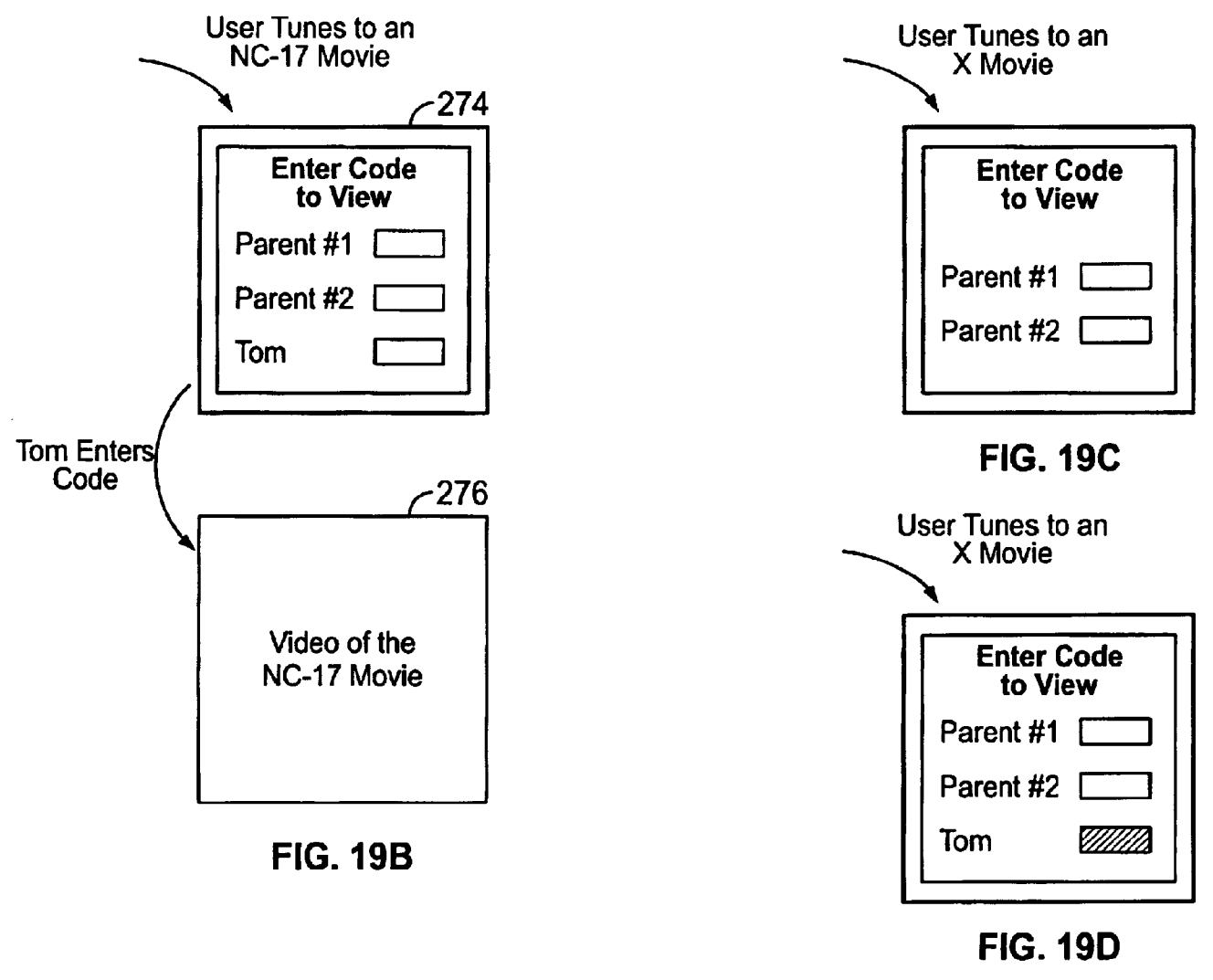

Illustrative display screens 274 and 276 of FIG. 19b may be provided based on illustrative lock list 272 of FIG. 19a. Display screen 274 may include a block for an NC-17 movie that has been tuned and may include prompts for the entry of a valid program control code by an authorized user. Video of the NC-17 movie is displayed when Tom, who is an authorized user, enters his code. But, as shown in FIGS. 19c and 19d, Tom, who is not in the list of authorized accounts for X-rated movies, is not prompted and, the two parent accounts are prompted for the entry of a program control code to remove the block on an X-rated movie that has been tuned.

Figure 20A:
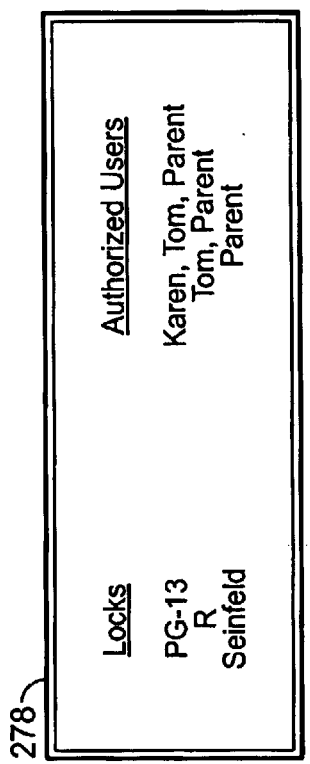
FIG. 20a is a diagram of an illustrative lock list in accordance with the present invention.
Figure 20B:
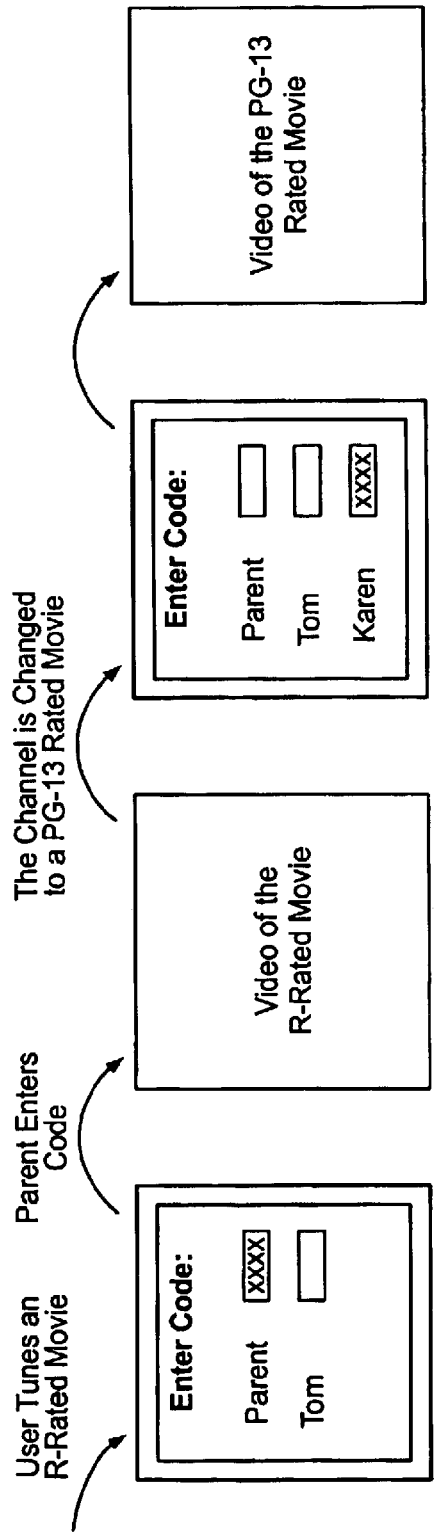
FIG. 20b is a diagram of an illustrative sequence of illustrative display screens that is based on the illustrative lock list of FIG. 20a in accordance with the present invention.

Illustrative display screens of FIGS. 20b, 20c and 20d may be provided based on illustrative lock list 278 of FIG. 20a. FIG. 20a shows that attribute locks may have been set for different values in the same attribute category (e.g., PG-13 and R-rated movies are on the list of locks). Different users may be authorized to view programming having different attribute values in the same category. In FIG. 20b, a parent enters a code to remove a block on an R-rated movie, but when the channel is then changed to display a lower rated movie, a PG-13 movie, the program guide may block the video and audio of the program because the new program has an attribute that matches an attribute that is in the lock list 278.

In FIG. 20c, a user may have tuned to a particular channel (e.g., channel #50) to view the movie ("Apocalypse Now." The movie which has an attribute that is on lock list 278, may be displayed when an authorized user enters a valid program control code. When a user changes the channel to another showing of "Apocalypse Now," the program is again blocked and user code entry is again forced. When the user turns back to that particular channel (e.g., channel #50) to return to viewing that showing of "Apocalypse-Now," the program may be blocked again and authorized code entry may be required.

Lock list 278 of FIG. 20a shows that there is a lock for programs with the title "Seinfeld." In FIG. 20d, a user (the parent) enters a program control code using display overlay 280 to remove a block on an episode of "Seinfeld." The user (the parent) is then again forced to enter a code when the user changes the channel to another channel that is also showing an episode of "Seinfeld." The user is then again forced to enter a code to view a program when the user returns back to the first Seinfeld episode that the user had tuned.

Figure 21A:
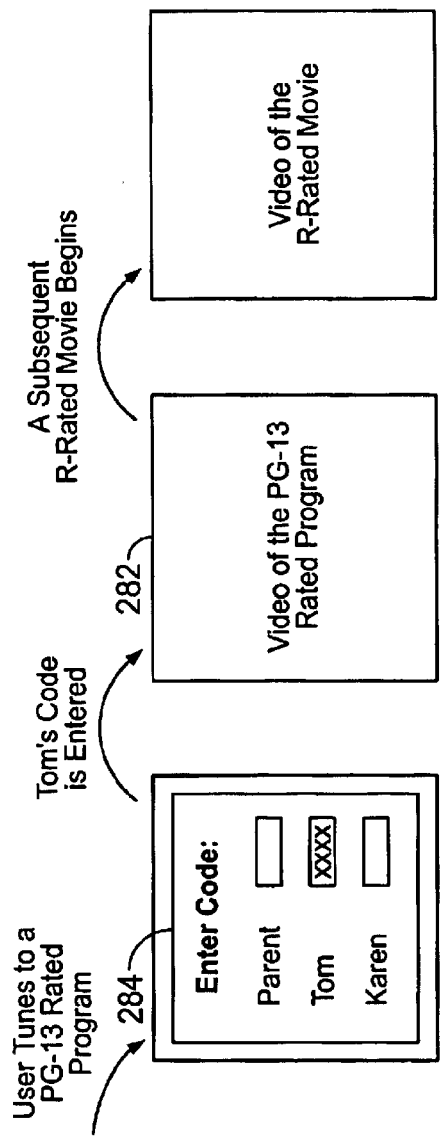
FIG. 21a is a diagram of an illustrative sequence of illustrative display screens that is based on the illustrative lock list of FIG. 20a in accordance with the present invention.
Figure 21B:
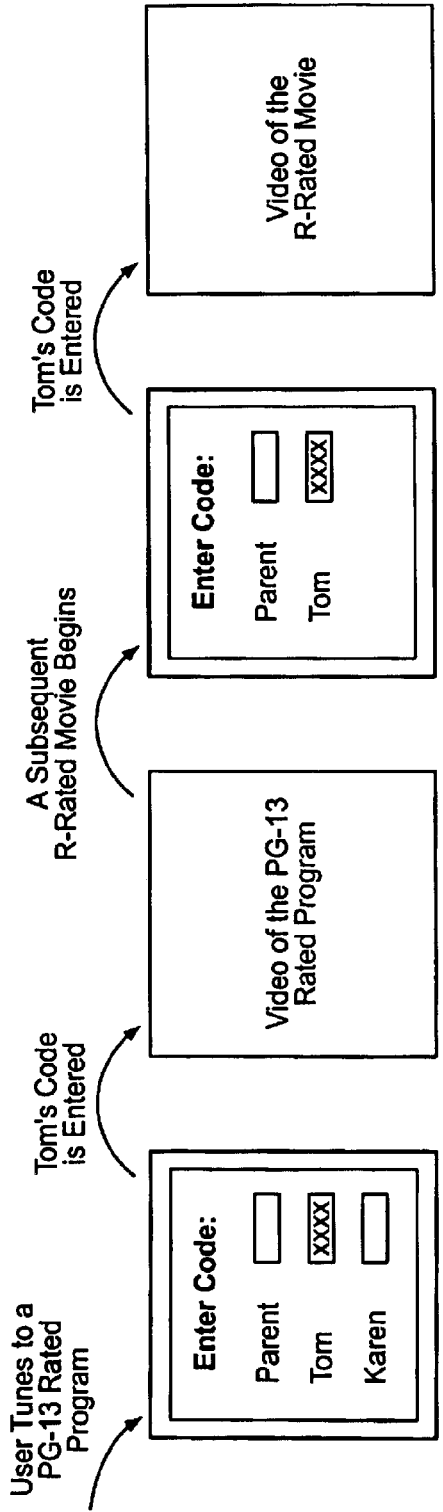
FIG. 21b is a diagram of an illustrative sequence of illustrative display screens that is based on the illustrative lock list of FIG. 20a in accordance with the present invention.
Figure 21C:
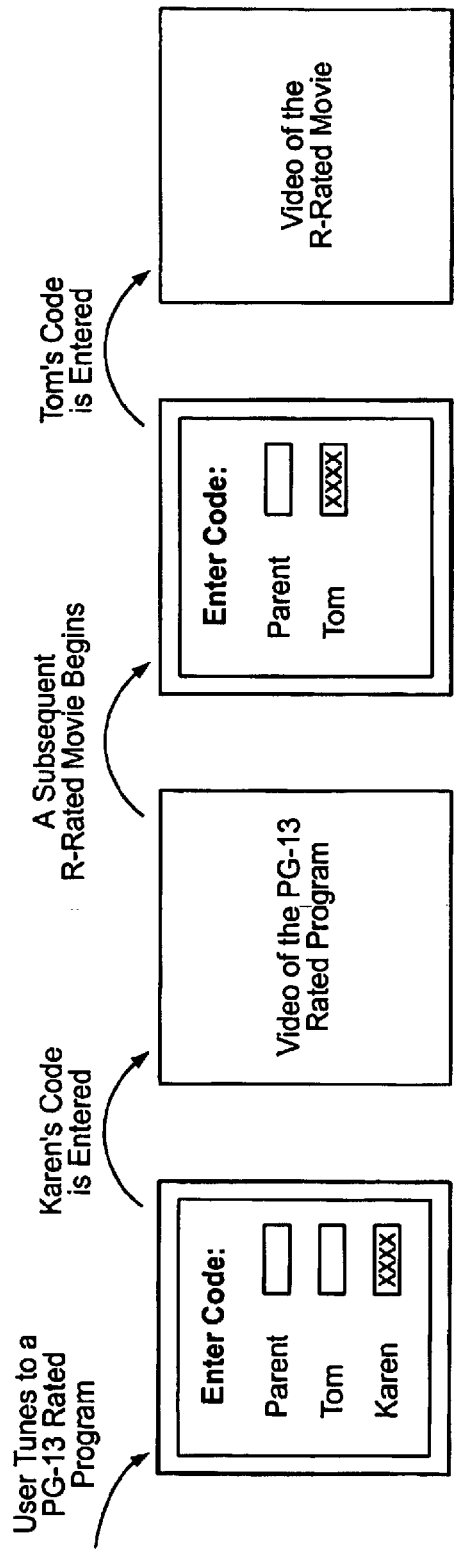
FIG. 21c is a diagram of an illustrative sequence of illustrative display screens that is based on the illustrative lock list of FIG. 20a in accordance with the present invention.

Illustrative display screens of FIGS. 21a, 21b, and 21c may be provided based on the illustrative lock list of FIG. 20a. Video of a PG-13-rated movie may be displayed in display screen 282 when the program control code for Tom is entered in overlay 284. Video for a subsequent R-rated movie may be displayed without forcing another login because the account for Tom is also listed in lock list 278 as an authorized user for R-rated movies.

If desired, as shown in FIG. 21b, video for the subsequent R-rated movie may be blocked to require Tom or another user to enter a code (again) to have the block removed.

In FIG. 21c, the program control code for Karen is entered to allow video for a PG-13-rated movie to be displayed. When an R-rated movie subsequently begins, the program guide may block the R-rated movie and force a code entry by an authorized user because Karen who is an authorized user for viewing a PG-13 movie is not an authorized user for viewing an R-rated movie.

Figure 22A:
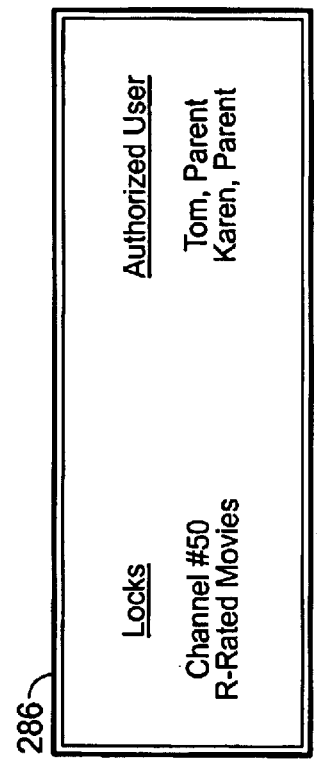
FIG. 22a is a diagram of an illustrative lock list in accordance with the present invention.
Figure 22B:
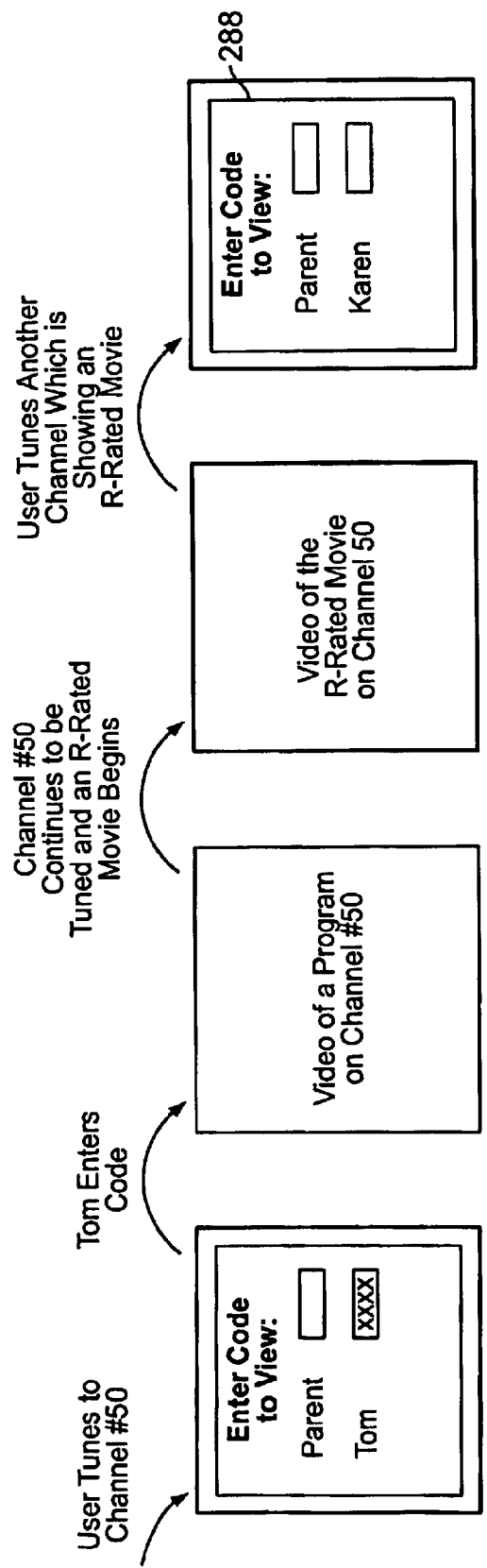
FIG. 22b is a diagram of an illustrative sequence of illustrative display screens that is based on the illustrative lock list of FIG. 22a in accordance with the present invention.

Illustrative display screens of FIG. 22b may be provided based on illustrative lock list 286 of FIG. 22a. Lock list 286 may include a lock for Channel #50 with Tom and parent as authorized users and a lock for R-rated movies with Karen and parent as authorized users. In FIG. 22b, video of a program on channel #50 may be displayed when the program control code for Tom is entered. Code entry to view Channel #50 may allow a user to view all the programming including R-rated movies, that are on Channel #50 while Channel #50 is continuously tuned. If desired, however, the R-rated movie on Channel #50 may be blocked even if the user has not changed the channel in the interim between code entry and the beginning of the R-rated movie. Overlay 288 may block video of an R-rated movie when the user tunes to another channel.

In operation, when a parent locks a rating, the guide may lock all programs that match that rating exactly (e.g., lock PG movies). If desired, the guide may lock all programs that match that rating or higher (e.g., lock PG and higher rated movies).

In FIG. 23a, parental control criteria display subscreen 300 indicates that there is a lock on PG-rated movies for Mike. In subscreen 302, the user may navigate to the movie rating category and may remove a lock on R-rated movies for Mike. The display screens of FIGS. 23b and 23c may be provided based on the display screens of FIG. 23a. In FIG. 23b, the program guide may block video of a PG-rated movie since there is an active lock on PG-rated movies for Mike, while the guide may allow video of an R-rated movie since the lock on R-rated movies for Mike has been removed and there are no other active locks on R-rated movies. If desired, as shown in FIG. 23c, video of the PG-rated and the R-rated movies may be displayed because removing the R-rated lock may have also removed the locks on lower movie ratings and there may have been no other active locks on PG-rated movies.

Figure 24:
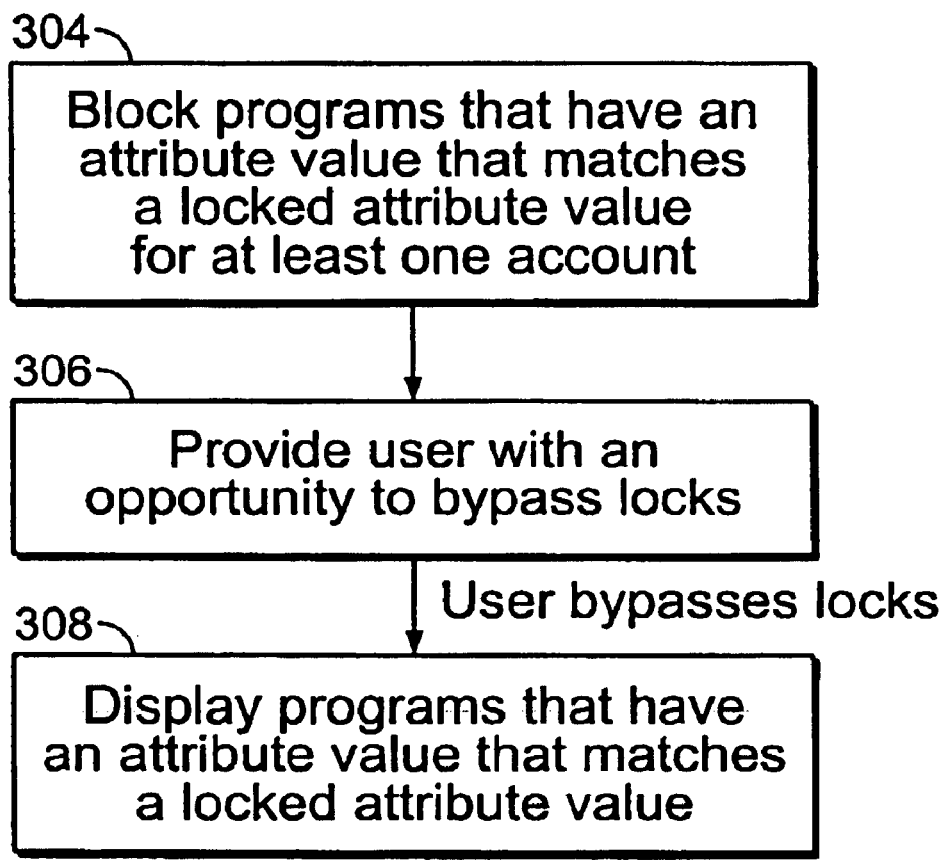
FIG. 24 is a flow chart of illustrative steps involved in displaying blocked programs using a bypass feature in accordance with the present invention.

Illustrative steps involved in displaying blocked programs with a bypass for locked attribute values for use in an interactive program guide system, such as system 50 of FIG. 1a, are shown in FIG. 24. At step 304, the program guide may block programs that have an attribute value that matches a locked attribute value for at least one account. At step 306, a user may be provided with an opportunity to bypass locks. At step 308, the program guide may display blocked programs when a user selects to bypass locks.

Illustrative parental control criteria display screen 310 of FIG. 25 may include bypass locks option 312 and may be displayed when a user enters a program control code (preferably, a parent program control code) after selecting a parental lock option from an information display screen, a navigator display screen, a program video display screen, etc. The program guide may bypass all locks when a user selects bypass locks option 312. If desired, a user may be required to enter a parent program control code when bypass locks option 312 is selected.

Figure 26A:
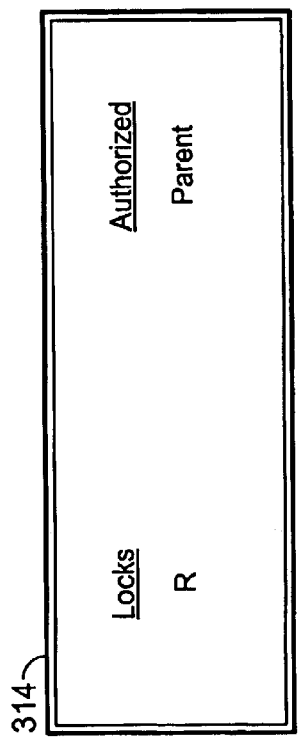
FIG. 26a is a diagram of an illustrative lock list in accordance with the present invention.
Figure 26B:
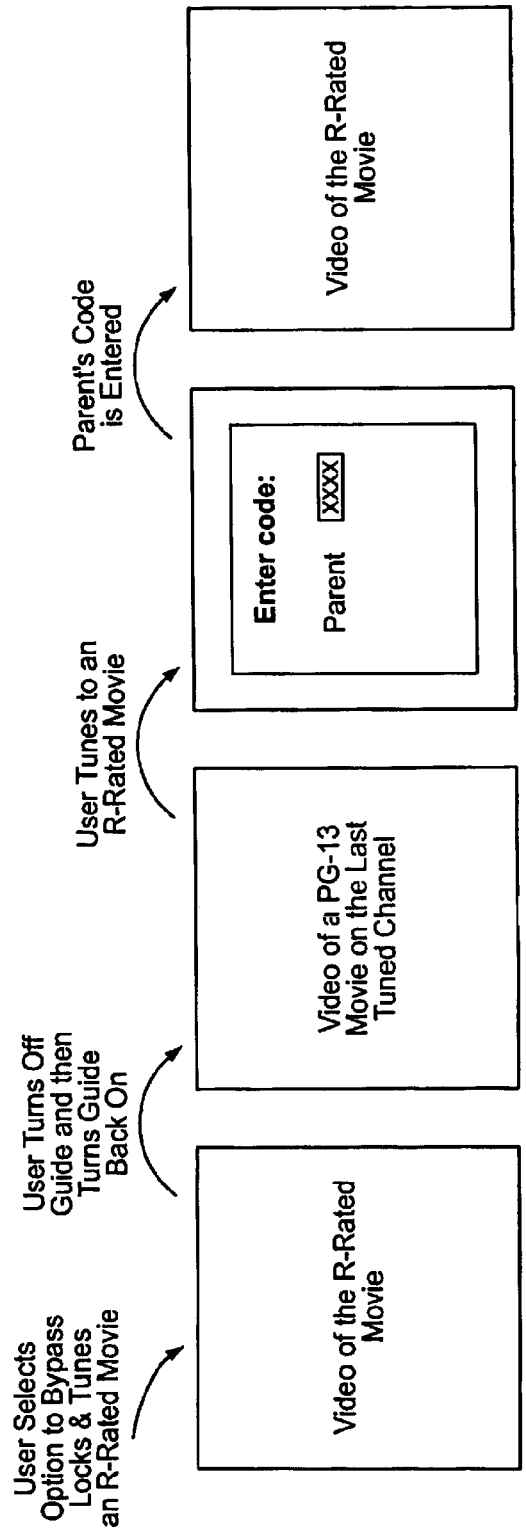
FIG. 26b is a diagram of an illustrative sequence of illustrative display screens that is based on the illustrative lock list of FIG. 26a in accordance with the present invention.
Figure 26C:
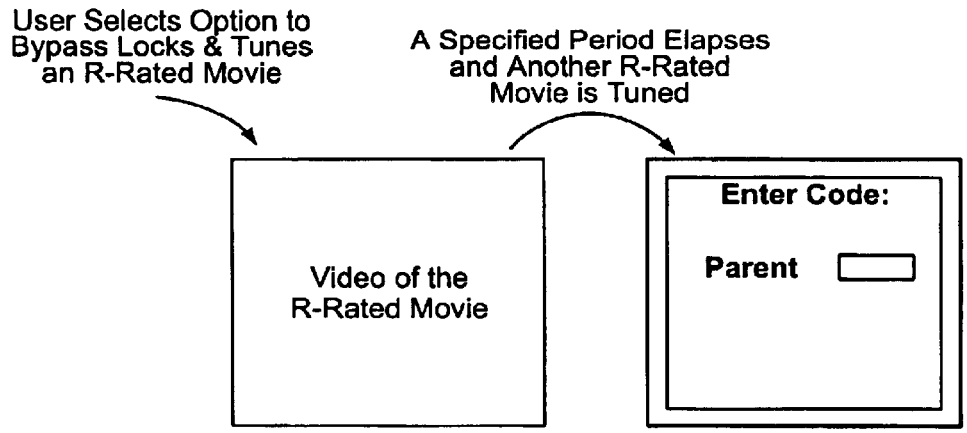
FIG. 26c is a diagram of an illustrative sequence of illustrative display screens that is based on the illustrative lock list of FIG. 26a in accordance with the present invention.

A user may be provided with an opportunity to turn off a bypass locks feature. The illustrative display screens of FIGS. 26b and 26c may be provided based on illustrative lock list 314 of FIG. 26a. In FIG. 26b, an option that was turned on to bypass locks may be turned off when a user turns the program guide off. In FIG. 26c, an option that was turned on to bypass locks may be turned off automatically when a specified period of time elapses.

Figure 27:
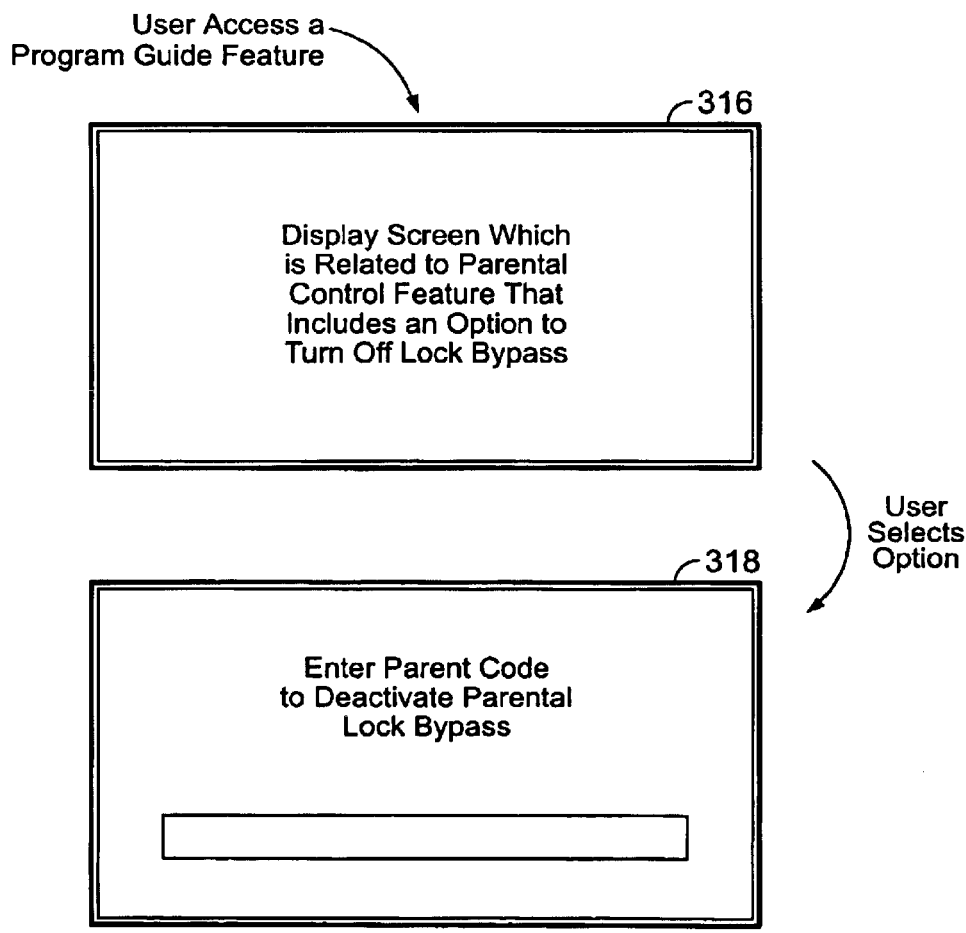
FIG. 27 is a diagram of an illustrative sequence of illustrative display screens involved in removing a lock bypass feature in accordance with the present invention.

Illustrative display screen 316 of FIG. 27 may be a display screen that is related to parental control features. Display screen 316 may provide a user with an opportunity to turn off a bypass lock option. Overlay 318 may optionally be displayed to allow a parent program code to be entered to turn off the lock bypass option when a user selects to turn off the option from display screen 316.

Figure 28:
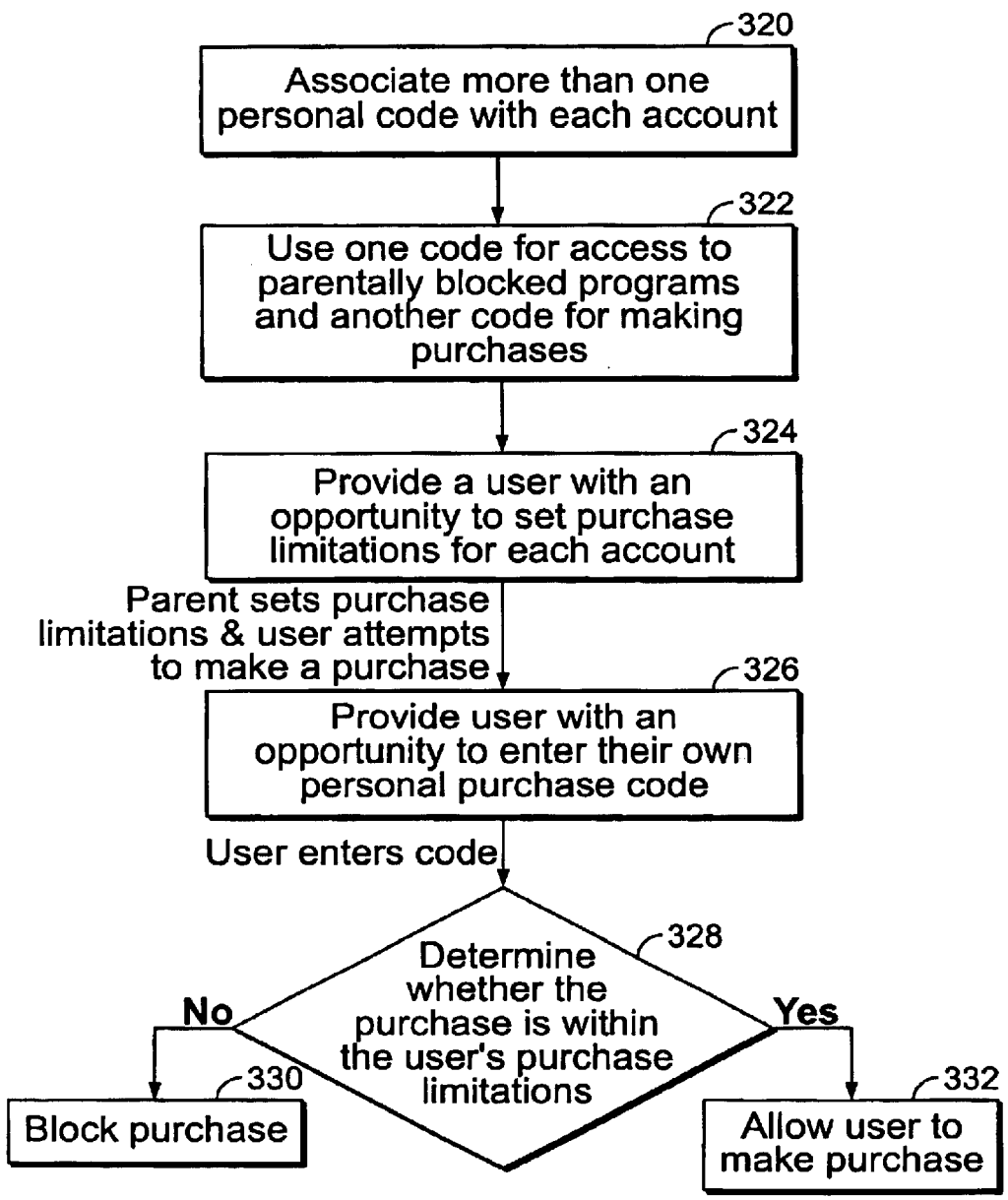
FIG. 28 is a flow chart of illustrative steps involved in controlling purchasing in accordance with the present invention.

Illustrative steps involved in controlling purchasing for use in an interactive program guide system, such as system 50 of FIG. 1a, are shown in FIG. 28. At step 320, more than one personal code may be associated with each account. At step 322, one code for each account may be used for access to parentally blocked programming and another code may be used for making purchases. At step 324, a user may be provided with an opportunity to set purchase limitations for each account. If desired, the opportunity to set purchase limitations for each account may be limited to users who have parent accounts. At step 326, a user who attempts to make a purchase may be provided with an opportunity to enter the purchase code that is associated with that user's account. At step 328, the program guide may determine whether the intended purchase is within the user's purchase limitations. At step 330, the program guide may block the user from making the purchase when the program guide determines that the intended purchase is not within the user's purchase limitations. At step 332, the program guide may allow the user to make the purchase when the program guide determines that the intended purchase is within the user's purchase limitations.

Figure 29:
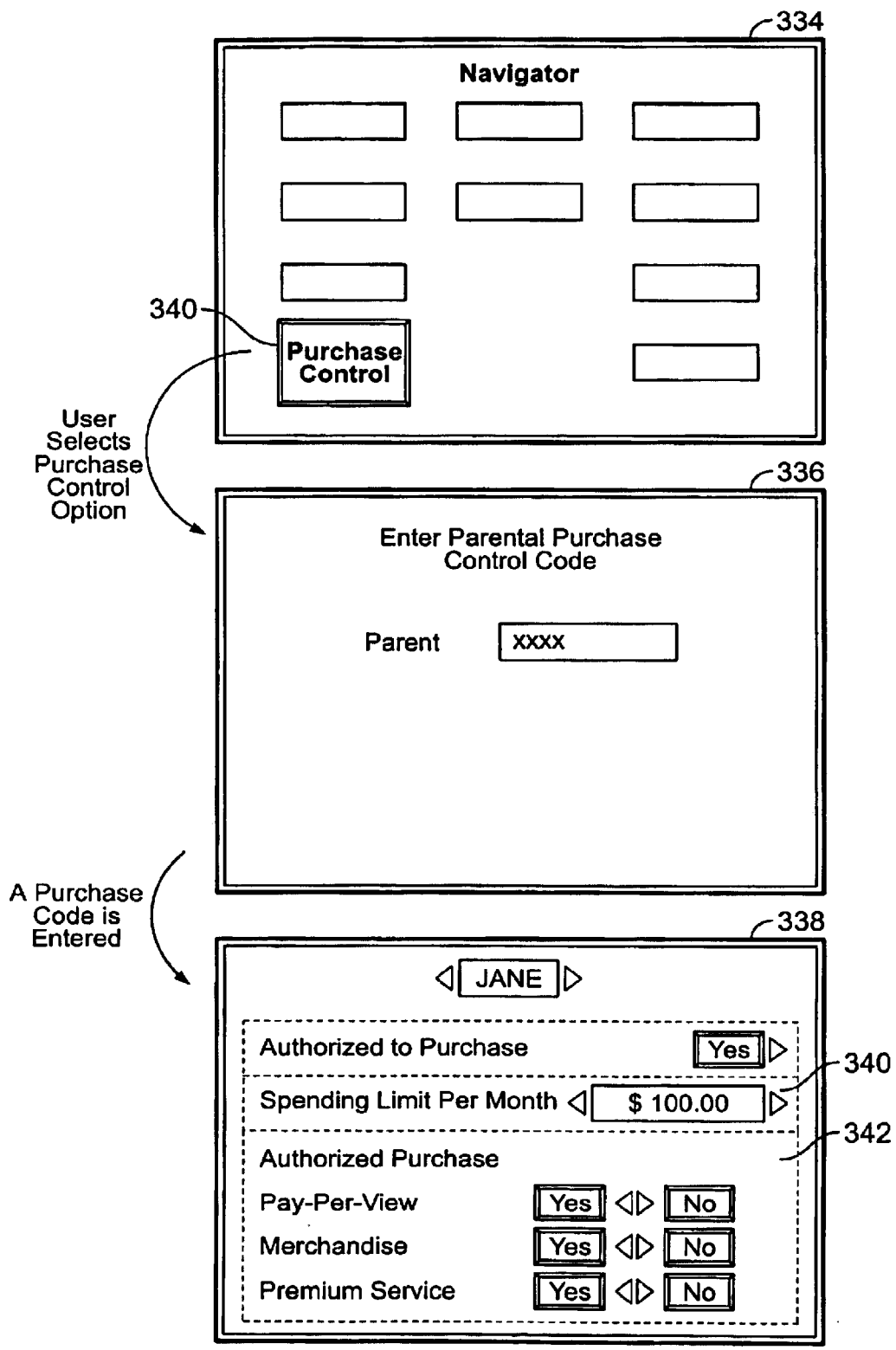
FIG. 29 is a diagram of an illustrative sequence of illustrative display screens that is based on the illustrative steps of FIG. 28 in accordance with the present invention.

Illustrative navigator display screen 334, illustrative purchase control code display screen 336, and illustrative purchase control criteria display screen 338 of FIG. 29 may be displayed based on the illustrative steps of FIG. 28. Purchase control code display screen 336 may be displayed when purchase control option 340 of navigator display screen 334 is selected. If desired, purchase control code display screen 336 may be displayed as an overlay. Purchase control criteria display screen 338 may be displayed when a valid parent code has been entered in purchase control code display screen 336. Purchase control criteria display screen 338 may provide a user with an opportunity to set purchase control criteria for each account. Purchase control criteria display screen 338 may allow a user to select which accounts (preferably which non-parent accounts) are authorized to make purchases. If desired, purchase control criteria display screen 338 may include spending limit option 340 which may provide a user with an opportunity to specify a spending limit for a specified period of time. If desired, purchase control criteria display screen 338 may include purchase type option 342 that provides a user with an opportunity to select which types of purchases (e.g., pay-per-view, merchandise, etc.) an account holder is authorized to make.

Figure 30A:
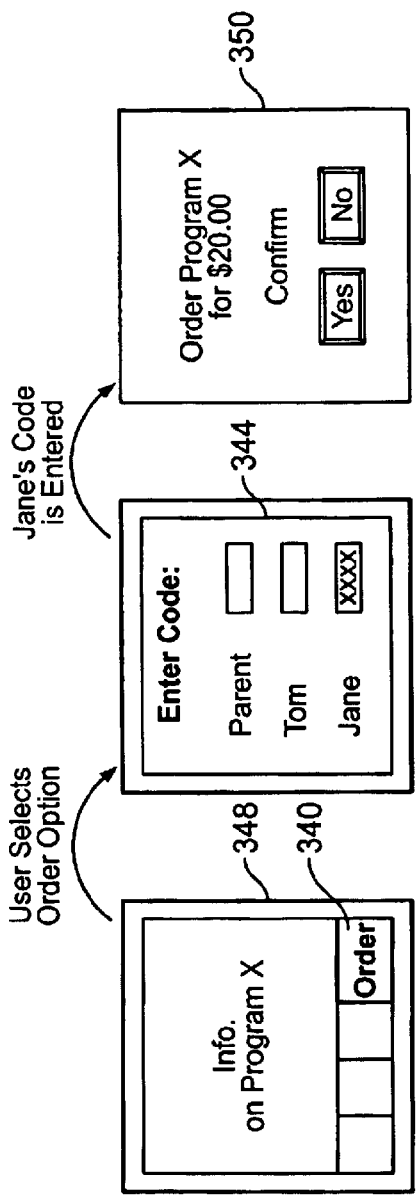
FIGS. 30a, 30b, 30c, and 30d are each a diagram of an illustrative sequence of illustrative display screens that is based on the illustrative steps of FIG. 28 in accordance with the present invention.
Figure 30B:
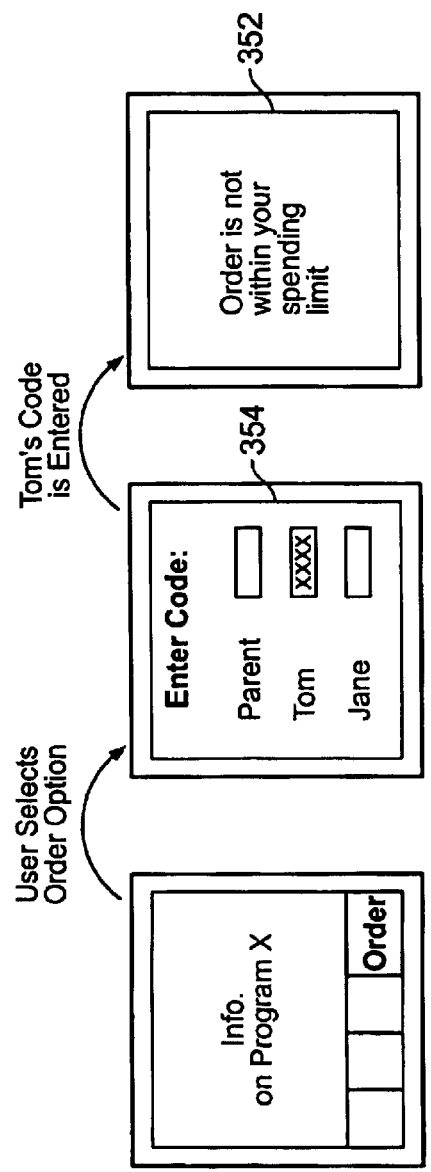

Illustrative display screens of FIGS. 30a, 30b, 30c, and 30d may be provided based on the illustrative steps of FIG. 28. Illustrative purchase control code overlay 344 of FIG. 30a may be displayed when a user selects order option 346 of information display screen 348. Order display screen 350 may be displayed when a purchase control code for an account is entered and that account is authorized to make this purchase (i.e., the purchase control limitations on the account currently do not prohibit this purchase). In FIG. 30b, overlay 352 is displayed to indicate that an intended purchase has been blocked. Overlay 352 may be displayed when the account for the purchase code that has been entered in overlay 354 is not authorized to make this purchase due to a spending limit on that account.

Figure 30C:
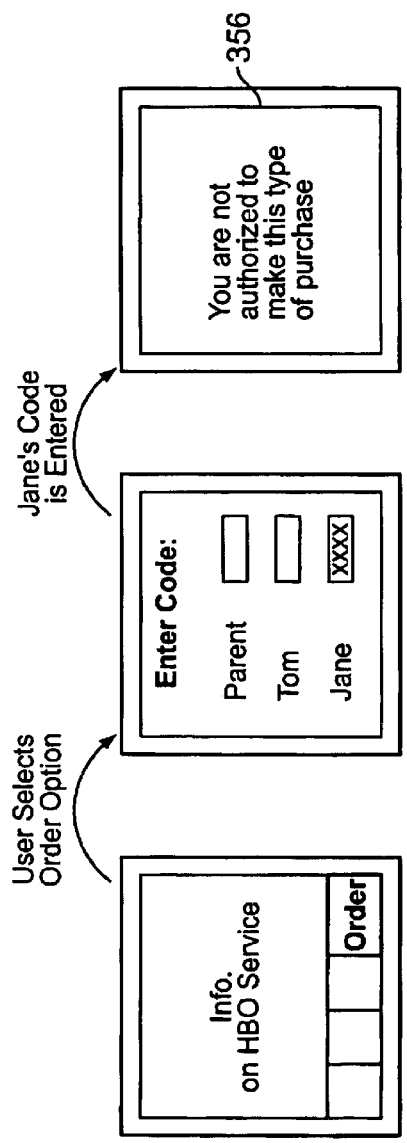
Figure 30D:
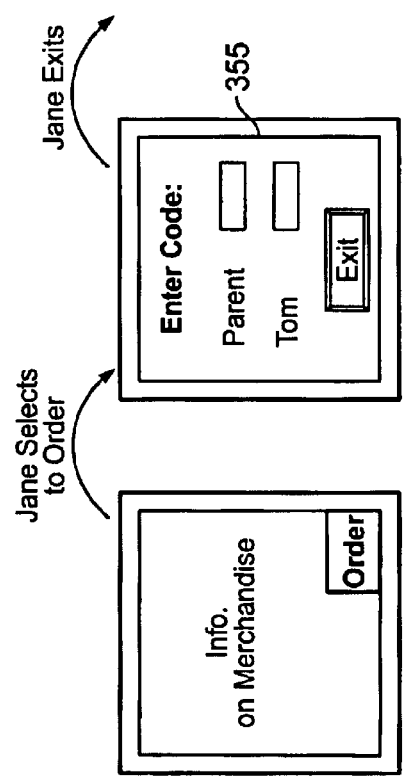

Illustrative overlay 356 of FIG. 30c is displayed to indicate that an intended purchase has been blocked because the account for which a purchase control code has been entered is not authorized to make purchases of this type (e.g., to purchase a premium service). Illustrative overlay 355 of FIG. 30d is displayed to prompt users who are authorized to make a particular purchase to enter their purchase control code. A prompt for unauthorized users (e.g., Jane) is not provided.

Figure 31:
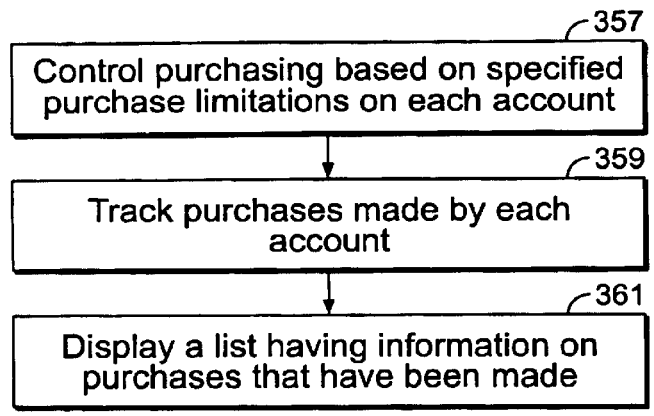
FIG. 31 is a flow chart of illustrative steps involved in tracking user purchases in accordance with the present invention.

Illustrative steps involved in tracking user purchases for use in an interactive program guide system, such as system 50 of FIG. 1a, are shown in FIG. 31. At step 357, purchasing may be controlled based on the purchase limitations on each account. At step 359, the program guide may track purchases that are made by each account (e.g., by detecting which account purchase codes has been entered). At step 361, a list having information on purchases that have been made may be provided.

Figure 32A:
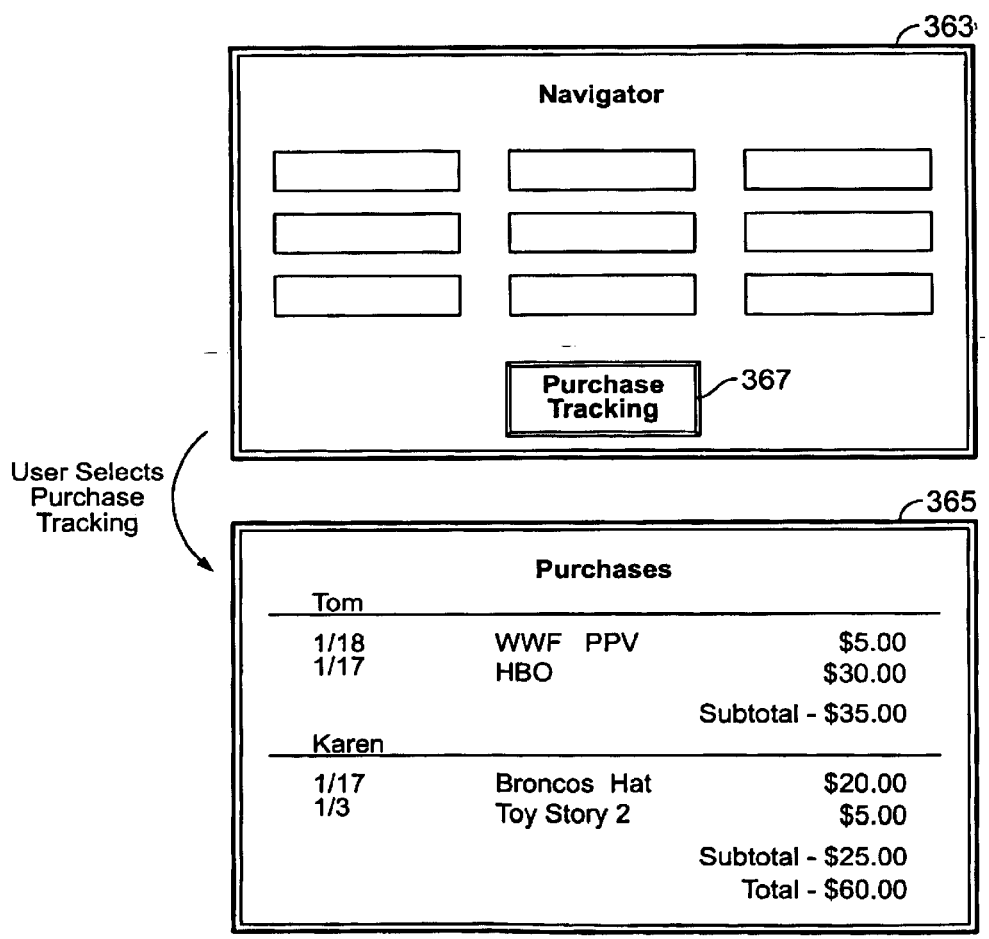
FIG. 32a is a diagram of an illustrative sequence of illustrative display screens that is based on the illustrative steps of FIG. 31 in accordance with the present invention.

Illustrative navigator display screen 363 and illustrative purchase tracking display screen 365 of FIG. 32a may be displayed based on the illustrative steps of FIG. 31. Purchase tracking display screen 365 may be displayed when purchase tracking option 367 of navigator display screen 363 is selected. Purchase tracking display screen 365 may include a record of purchases that have been made. Display screen 365 may include (as shown) a subtotal for each account and a total for all accounts. If desired, purchase records may be displayed in sorted order and subtitled by the account whose code was entered to complete the purchase.

Account related purchasing information may be provided to a billing entity. For example, illustrative cable service bill 358 of FIG. 32b may have the name of the account whose purchase code was used to make purchase printed next to the name of what was purchased (e.g., HBO service—Tom). Illustrative credit card statement of a parent 360 of FIG. 32c may include the name of a purchasing account next to the product or service that was purchased using the credit card. If desired, such bills may include purchases subtotaled by account. For example, the cable bill may include a separate section of purchases that are sorted by account and subtotaled, or the credit card bill may include a similar section of purchases sorted and subtotaled by account.

Figure 33:
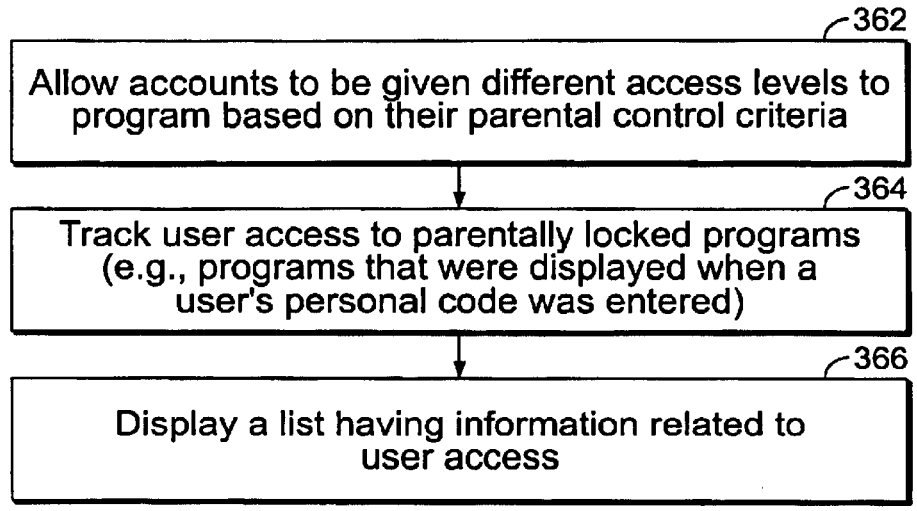
FIG. 33 is a flow chart of illustrative steps involved in tracking user-accessed programming in accordance with the present invention.

Illustrative steps involved in tracking user-accessed programming for use in an interactive program guide system, such as system 50 of FIG. 1a, are shown in FIG. 33. At step 362, the program guide may give user accounts different levels of access to programming (e.g., different levels of access based on the parental control criteria for each account). At step 364, the program guide may track user access to parentally locked programs (e.g., programs that were displayed when a user's program control code was entered). At step 366, the program guide may display a list having information that is related to each user's parentally controlled access history.

Figure 34:
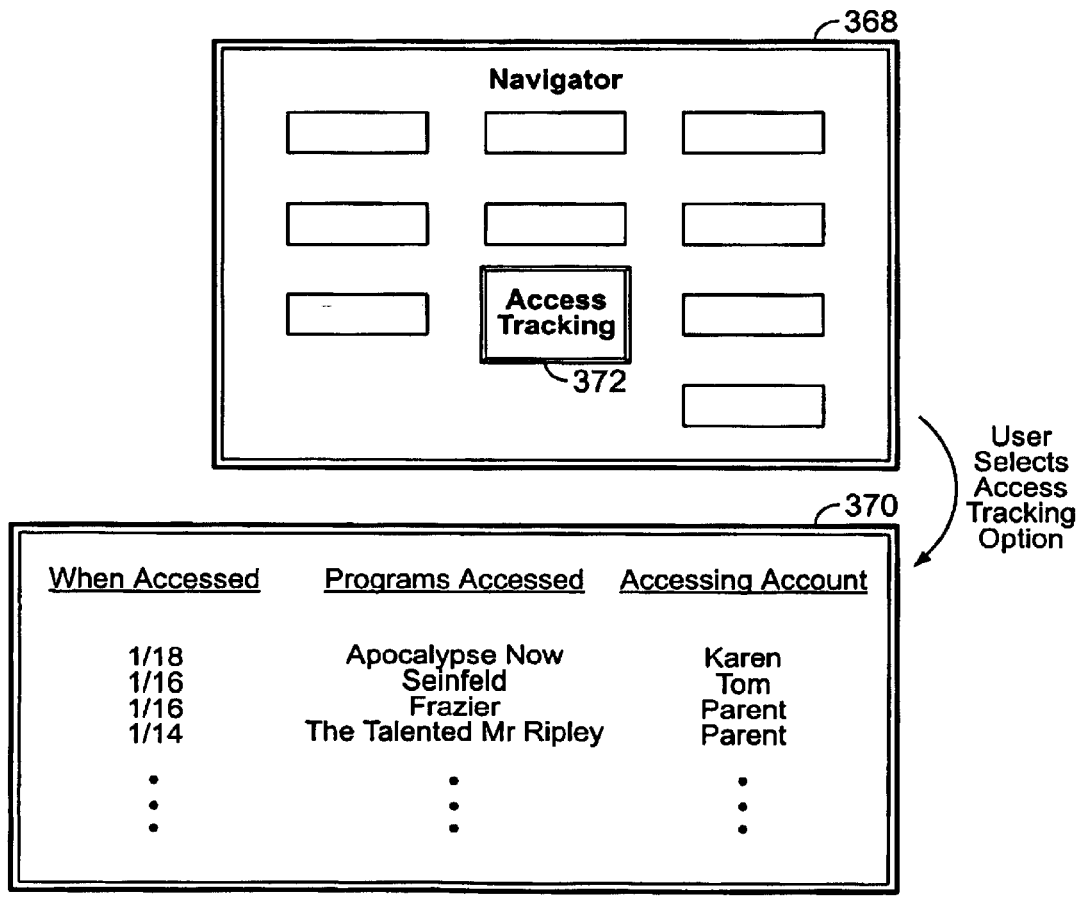
FIG. 34 is a diagram of an illustrative sequence of illustrative display screens that is based on the illustrative steps of FIG. 33 in accordance with the present invention.

Illustrative navigator display screen 368 and illustrative access tracking display screen 370 of FIG. 34 may be displayed based on the illustrative steps of FIG. 33. Access tracking display screen 370 may be displayed when access tracking option 372 is selected. If desired, the program guide requires that a user enter a parent program control code before displaying access tracking display screen 370. Access tracking display screen 370 may include a list of parentally controlled programs that have been accessed and the name of the account whose code was used to access the program.

Figure 35:
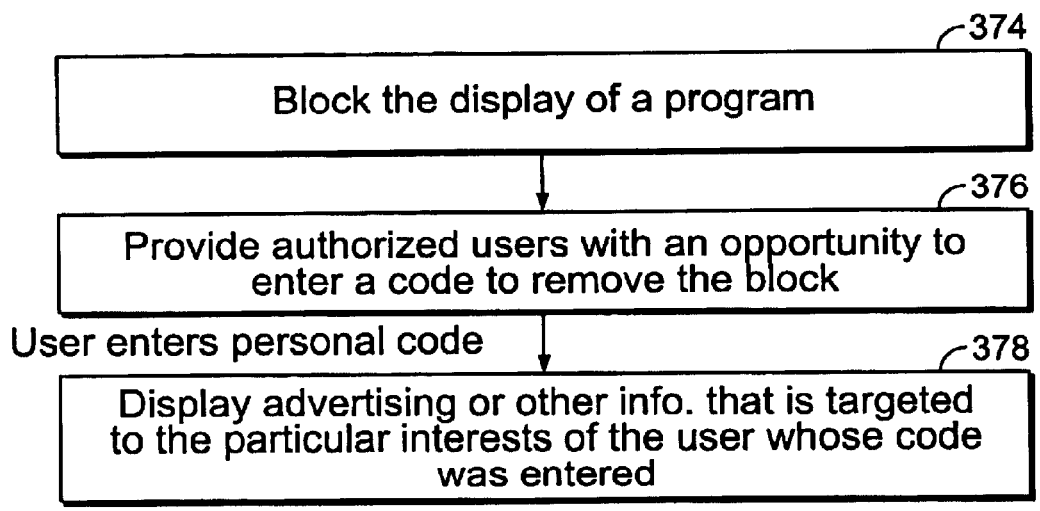
FIG. 35 is a flowchart of illustrative steps involved in displaying targeted advertising in accordance with the present invention.
Figure 36:
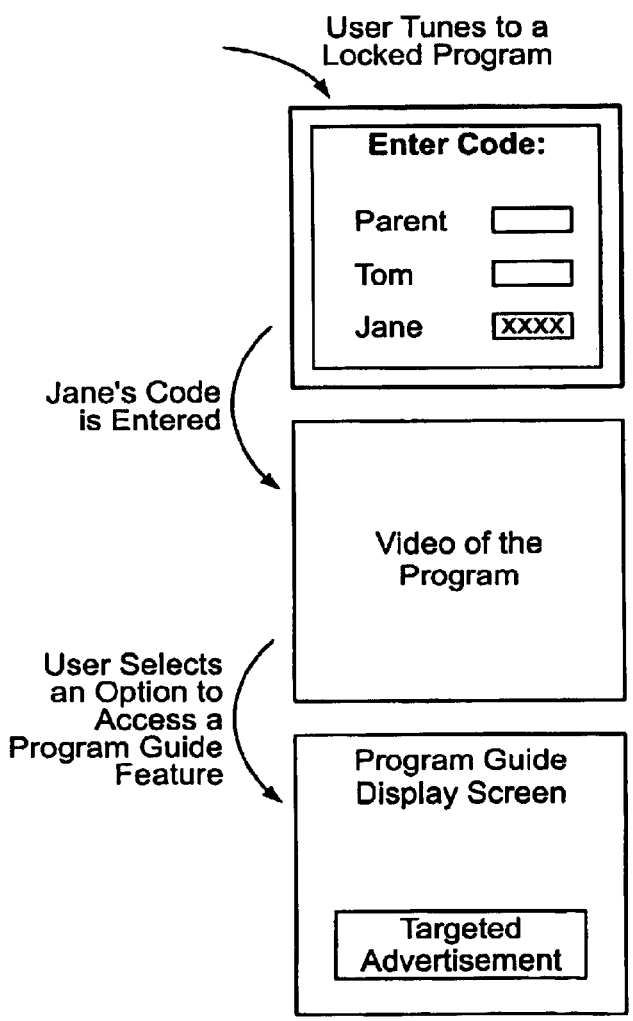
FIG. 36 is a diagram of an illustrative sequence of illustrative display screens that is based on the illustrative steps of FIG. 35 in accordance with the present invention.

Illustrative steps involved in displaying targeted advertising for use in an interactive program guide system, such as system 50 of FIG. 1a, are shown in FIG. 35. At step 374, the program guide may block a program from being displayed. At step 376, authorized users may be provided with an opportunity to enter a program control code to remove the block. At step 378, the program guide may display advertising that is targeted to the particular interests of the user whose code has been entered to remove the block. Illustrative display screens of FIG. 36 may be provided based on the illustrative steps of FIG. 35. In FIG. 36, the program guide displays an advertisement that is targeted to Jane when program code for Jane's account is used to access the current program. If desired, advertising may be targeted to the user whose code was used last.

Figure 37A:
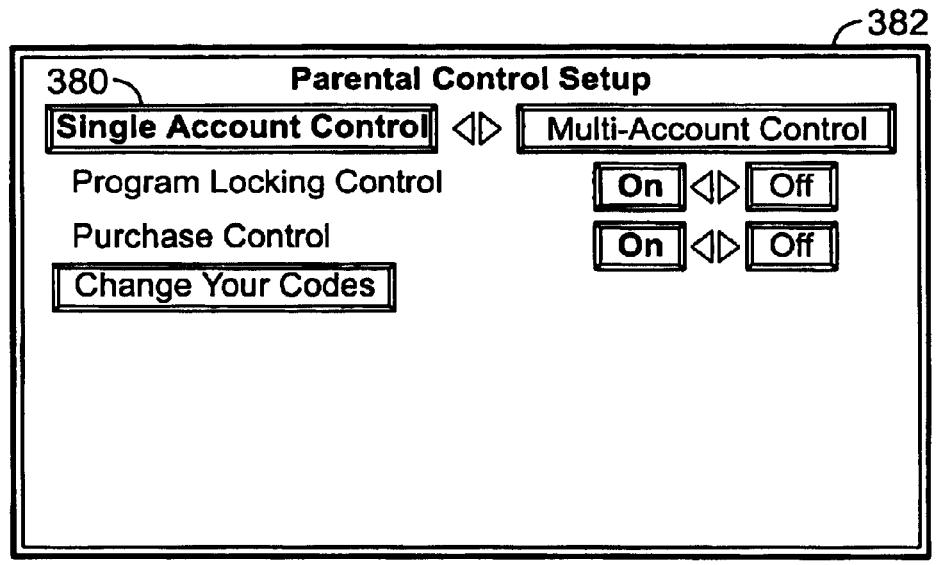
FIGS. 37a, 37b, 37c, 37d, and 37e are each diagrams of an illustrative display screen for single account control in accordance with the present invention.
Figure 37B:
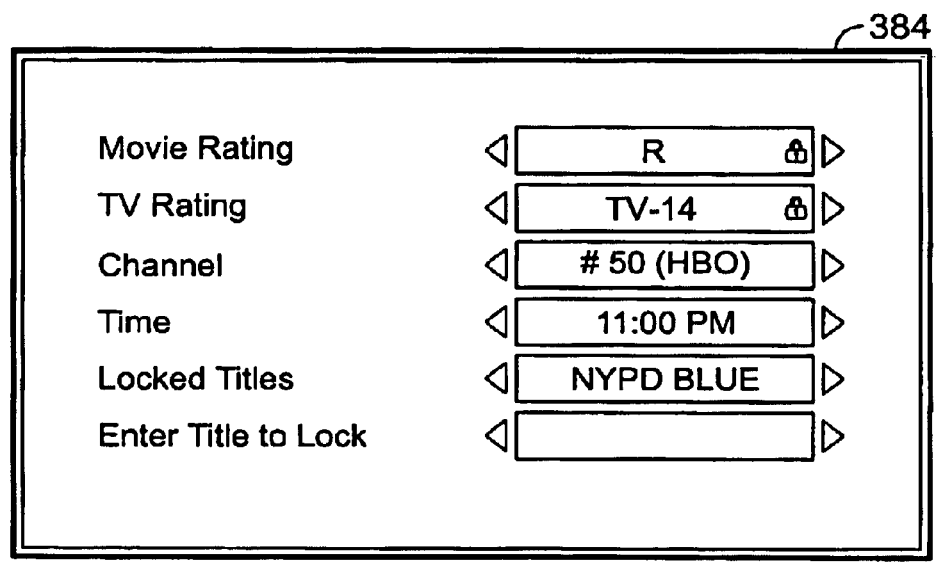
Figure 37C:
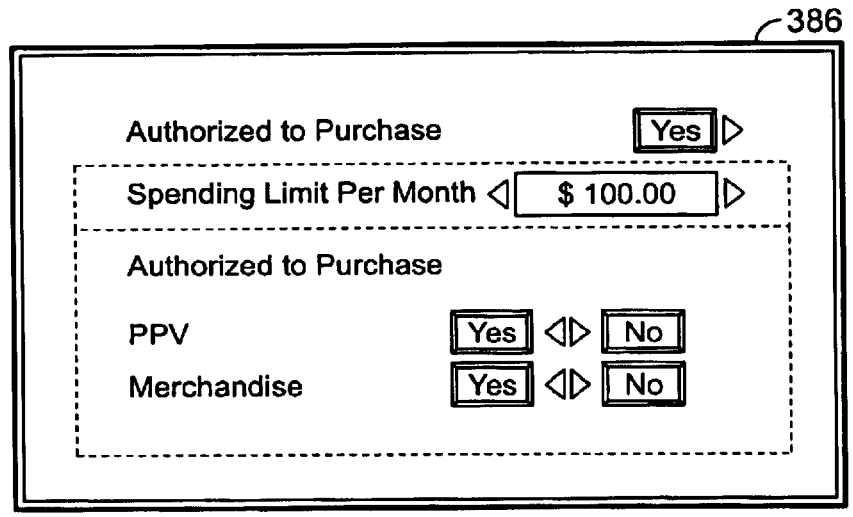
Figure 37D:
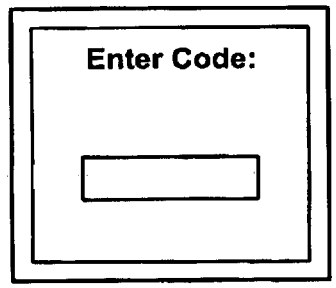
Figure 37E:
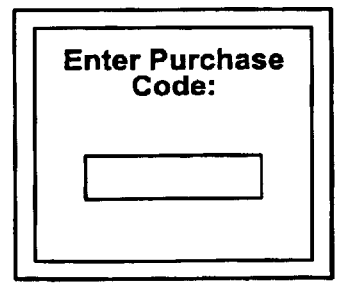

A household may choose to have only one account and not set up control criteria for multiple accounts. The system may operate using only one account when a user selects single account control option 380 of parental control setup display screen 382 of FIG. 37a or when a single account is set up using the multi-account control option. The user may select the parental program control criteria for that one account using program control criteria display screen 384 of FIG. 37b. The user may select the purchase control criteria for that account using purchase control criteria display screen 386 of FIG. 37c. FIGS. 37d and 37e show that the display of a program or the purchase of a product may be blocked based on program and purchase control criteria for the account and that an opportunity is provided for the entry of a single program control code or purchase control code to remove a block.

Some of the display screens that are shown in the FIGS. have included an exit option for exiting from a current display screen (e.g., back to a previous display screen) without accepting or making selections in the current display screen. Other techniques for exiting may also be used, such as using an exit key of a remote control.

The foregoing is merely illustrative of the principles of this invention and various modifications can be made by those skilled in the art without departing from the scope and spirit of the invention.

What is claimed is:

1. An interactive television system having user television equipment on which an interactive television application is at least partially implemented to provide parental control of television programming that is available for viewing by users without purchasing, said user television equipment, being configured to:
   support multiple user accounts using the interactive television application, wherein each of the user accounts has an associated personal identification code;
   set parental control criteria for each of the user accounts using the interactive television application;
   block the television programming that matches at least one of the parental control criteria;
   allow a user to view the blocked television programming by entering a personal identification code associated with one of the user accounts that has parental control criteria that permits viewing of the blocked television programming;
   track the blocked television programming that has been viewed based on the personal identification code that was entered to view the television programming; and
   display a log of blocked television programming that has been viewed without purchasing, wherein the log includes information on the multiple user accounts that are associated with the personal identification codes that were entered to view the blocked television programming and wherein the information on the multiple user accounts further includes account names that correspond to the personal identification codes that were entered to view the blocked television programming.

2. The system defined in claim 1 wherein at least one of the user accounts has been designated as a parent account and at least one of the user accounts is designated as a child account.

3. The system defined in claim 2 wherein the parent account is without restrictions on television programming viewing.

4. The system defined in claim 2 wherein the user television equipment is further configured to temporarily bypass blocking of television programming on entry of the personal identification code for the parent account.

5. The system defined in claim 1 wherein advertisements are targeted based on which personal identification code was most recently entered.

6. The system defined in claim 1 wherein the interactive television application is an interactive television program guide application.

7. A method for use in an interactive television system having user television equipment on which an interactive television application is at least partially implemented to provide parental control of television programming that is available for viewing by users without purchasing, comprising:
   using the interactive television application to support multiple user accounts, wherein each of the user accounts has an associated personal identification code;
   setting parental control criteria for each of the user accounts;
   blocking the television programming that match at least one of the parental control criteria;
   allowing a user to view the blocked television programming by entering a personal identification code associated with one of the user accounts that has parental control criteria that permits viewing of the blocked television programming;
   tracking the blocked television programming that has been viewed based on the personal identification code that was entered to view the television programming; and
   displaying a log of blocked television programming that has been viewed without purchasing, wherein the log includes information on the multiple user accounts that are associated with the personal identification codes that were entered to view the blocked television programming and wherein the information on the multiple user accounts further includes account names that correspond to the personal identification codes that were entered to view the blocked television programming.

8. The method defined in claim 7 further comprising:
   designating at least one of the user accounts as a parent account; and
   designating at least one of the user accounts as a child account.

9. The method defined in claim 8 wherein the parent account is without restrictions on television programming viewing.

10. The method defined in claim 8 further comprising temporarily bypassing the blocking of television programming on entry of the personal identification code for the parent account.

11. The method defined in claim 7 further comprising targeting advertisements based on which personal identification code was most recently entered.

12. The method defined in claim 7 wherein the interactive television application is an interactive television program guide application.

13. An interactive television system having user television equipment on which an interactive television application is at least partially implemented to provide parental control of television programming that is available for viewing by users without purchasing, comprising:

means for using the interactive television application to support multiple user accounts, wherein each of the user accounts has an associated personal identification code;

means for setting parental control criteria for each of the user accounts;

means for blocking the television programming that match at least one of the parental control criteria;

means for allowing a user to view the blocked television programming by entering a personal identification code associated with one of the user accounts that has parental control criteria that permits viewing of the blocked television programming;

means for tracking the blocked television programming that has been viewed based on the personal identification code that was entered to view the television programming; and means for displaying a log of blocked television programming that has been viewed without purchasing, wherein the log includes information on the multiple user accounts that are associated with the personal identification codes that were entered to view the blocked television programming and wherein the information on the multiple user accounts further includes account names that correspond to the personal identification codes that were entered to view the blocked television programming.

14. The system defined in claim 13 further comprising:

means for designating at least one of the user accounts as a parent account; and means for designating at least one of the user accounts as a child account.

15. The system defined in claim 14 wherein the parent account is without restrictions on television programming viewing.

16. The system defined in claim 14 further comprising means for temporarily bypassing the blocking of television programming on entry of the personal identification code for the parent account.

17. The system defined in claim 13 further comprising means for targeting advertisements based on which personal identification code was most recently entered.

18. The system defined in claim 13 wherein the interactive television application is an interactive television program guide application.

19. Machine-readable media for use in an interactive television system having user television equipment on which an interactive television application is at least partially implemented to provide parental control of television programming that is available for viewing by users without purchasing, wherein the machine-readable media is encoded with machine-readable instructions thereon for:

using the interactive television application to support multiple user accounts, wherein each of the user accounts has an associated personal identification code;

setting parental control criteria for each of the user accounts;

blocking the television programming that match at least one of the parental control criteria;

allowing a user to view the blocked television programming by entering a personal identification code associated with one of the user accounts that has parental control criteria that permits viewing of the blocked television programming;

tracking the blocked television programming that has been viewed based on the personal identification code that was entered to view the television programming; and displaying a log of blocked television programming that has been viewed without purchasing, wherein the log includes information on the multiple user accounts that are associated with the personal identification codes that were entered to view the blocked television programming and wherein the information on the multiple user accounts further includes account names that correspond to the personal identification codes that were entered to view the blocked television programming.

20. The machine-readable media defined in claim 19 is further encoded with machine-readable instructions thereon for:

designating at least one of the user accounts as a parent account; and designating at least one of the user accounts as a child account.

21. The machine-readable media defined in claim 20 wherein the parent account is without restrictions on television programming viewing.

22. The machine-readable media defined in claim 8 is further encoded with machine-readable instructions thereon for temporarily bypassing the blocking of television programming on entry of the personal identification code for the parent account.

23. The machine-readable media defined in claim 19 is further encoded with machine-readable instructions thereon for targeting advertisements based on which personal identification code was most recently entered.

24. The machine-readable media defined in claim 19 wherein the interactive television application is an interactive television program guide application.

* * * * *

UNITED STATES PATENT AND TRADEMARK OFFICE
CERTIFICATE OF CORRECTION

PATENT NO. : 6,922,843 B1  Page 1 of 1
APPLICATION NO. : 09/635596
DATED : July 26, 2005
INVENTOR(S) : W. Benjamin Herrington et al.

It is certified that error appears in the above-identified patent and that said Letters Patent is hereby corrected as shown below:

Sheet 19, Figure 15, change "Ripely" to --Ripley--

Sheet 34, Figure 27, change "Access" to --Accesses--

Column 16, line 40, delete "of" after "for"

Column 17, line 21, delete "," after "and"

Column 17, line 40, change "Now.""" to --Now")--

Column 17, line 41, delete "," after "278"

Column 17, line 46, change "Apocalypse-Now" to --Apocalypse Now--

Signed and Sealed this

Twelfth Day of May, 2009

JOHN DOLL
*Acting Director of the United States Patent and Trademark Office*